(12) United States Patent
Regev et al.

(10) Patent No.: US 12,028,119 B1
(45) Date of Patent: Jul. 2, 2024

(54) IN-PHASE/QUADRATURE SIGNAL FILTERING IN WIRELESS COMMUNICATION

(71) Applicant: QUALCOMM Incorporated, San Diego, CA (US)

(72) Inventors: Aviv Regev, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/065,388

(22) Filed: Dec. 13, 2022

(51) Int. Cl.
*H04B 17/11* (2015.01)
*H04L 27/00* (2006.01)
*H04W 72/51* (2023.01)

(52) U.S. Cl.
CPC ............ *H04B 17/11* (2015.01); *H04W 72/51* (2023.01); *H04L 2027/0016* (2013.01)

(58) Field of Classification Search
CPC ......... H04L 25/03267; H04L 25/03057; H04L 25/03146
See application file for complete search history.

(56) References Cited

U.S. PATENT DOCUMENTS

| 2011/0013724 | A1 | 1/2011 | Metreaud et al. |
| 2014/0273907 | A1 | 9/2014 | Narasimhan et al. |
| 2017/0302482 | A1* | 10/2017 | Pathikulangara ........................... H04L 25/03038 |
| 2021/0328837 | A1 | 10/2021 | Pick et al. |
| 2021/0359896 | A1* | 11/2021 | Nayebi ................... H04B 1/30 |
| 2022/0014412 | A1 | 1/2022 | Yunusov et al. |
| 2023/0421428 | A1* | 12/2023 | Agrawal ............... H04L 27/364 |
| 2024/0072861 | A1* | 2/2024 | Lu ...................... H04L 25/0224 |

FOREIGN PATENT DOCUMENTS

CN 104052695 A 9/2014

OTHER PUBLICATIONS

Tsuchida N., et al., "Measurement Method of Transmitter IQ Imbalance in Digital Coherent Communication Systems", SPIE OPTO, Mar. 3, 2022, 7 pp.
International Search Report and Written Opinion—PCT/US2023/078982—ISA/EPO—Feb. 15, 2024 14 pp.

* cited by examiner

*Primary Examiner* — Janice N Tieu
(74) *Attorney, Agent, or Firm* — QUALCOMM Incorporated

(57) ABSTRACT

An apparatus for wireless communication includes a memory and a processor coupled to the memory. The processor is configured to: receive one or more signals for determining frequency dependent in-phase quadrature imbalance (FDIQI) estimates; generate one or more FDIQI estimates based on the one or more signals; and transmit the one or more FDIQI estimates to a network node.

27 Claims, 15 Drawing Sheets

IN-PHASE/QUADRATURE SIGNAL FILTERING IN WIRELESS COMMUNICATION

TECHNICAL FIELD

The technology discussed below relates generally to wireless communication systems, and more particularly, to signal filtering for in-phase/quadrature modulation. Certain aspects may relate to techniques for enabling and providing communication devices configured to communicate using in-phase/quadrature modulation.

BACKGROUND

In-phase/quadrature modulation is a modulation technique in which a modulator modulates an in-phase carrier signal and a 90° out-of-phase carrier signal with a data signal to generate a first signal (e.g., in-phase signal) and a second signal (e.g., quadrature signal). A local oscillator generates the in-phase carrier signal, and a phase shift circuit shifts the signal generated by the local oscillator by 90° to generate the quadrature carrier signal. The first and second signals are combined resulting in a signal in which multiple bits can be conveyed in one symbol.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

This disclosure describes example techniques to determine filter coefficients to filter a signal prior to transmission to user equipments (UEs) based on in-phase/quadrature (IQ) imbalance estimates performed by the UEs. IQ imbalance refers to cases in which the in-phase signal and the quadrature phase signal are not 90° out-of-phase, which may be due to temperature changes or aging of the modulators.

The example techniques divide the imbalance correction by having the UEs estimate the IQ imbalance, and having a network node and/or radio unit(s) determine the filter coefficients for filters that are used to correct for the IQ imbalance. Where the network node determines the filter coefficients, the network node transmits the filter coefficients to a radio unit that communicates with one or more of the UEs. The radio unit may be configured to perform the IQ imbalance correction on a signal.

Such division of tasks for IQ imbalance correction leverages the capabilities of the UEs, network node, and/or radio units, while reducing complexity and delay. For instance, estimating the IQ imbalance at the network node or radio unit(s) may incur high complexity RF feedback per IQ modulator. As another example, for the UEs or the network node to perform the imbalance correction may result in frequent updates of the IQ imbalance estimate and frequency updates of the filter coefficients, such as every time there is a change in precoder coefficients at the network node. In one or more examples, the IQ imbalance estimate and correction (e.g., determination of filter coefficients for compensation) may be updated at a relatively low rate (e.g., a low refresh rate), such as instances when there is likelihood of IQ imbalance (e.g., due to temperature change or long aging), which tend to be infrequent. In some cases, because the determination of filter coefficients for IQ imbalance compensation may be independent of the precoder coefficients, the determination of the filter coefficients may occur relatively infrequently.

In one example, the disclosure describes an apparatus for wireless communication, comprising: a memory; and a processor coupled to the memory and configured to: receive one or more signals for determining frequency dependent in-phase quadrature imbalance (FDIQI) estimates; generate one or more FDIQI estimates based on the one or more signals; and transmit the one or more FDIQI estimates to a network node.

In one example, the disclosure describes an apparatus for wireless communication, comprising: a memory; and a processor coupled to the memory and configured to: cause transmission of one or more signals for frequency dependent in-phase quadrature imbalance (FDIQI) estimation to one or more user equipments (UEs); receive one or more FDIQI estimates from the one or more UEs for one or more radio units (RUs); generate information for one or more FDIQI compensation filter coefficients based on the one or more FDIQI estimates; and transmit the information for the one or more FDIQI compensation filter coefficients to the one or more RUs that are in communication with the one or more UEs.

In one example, the disclosure describes an apparatus for wireless communication, comprising: a memory; and a processor coupled to the memory and configured to: receive, from a network node, information for coefficients for one or more frequency dependent in-phase-quadrature imbalance (FDIQI) compensation filters; and communicate with a user equipment (UE) utilizing a link that is compensated by the one or more FDIQI compensation filters.

In one example, the disclosure describes a method of wireless communication, comprising: receiving one or more signals for determining frequency dependent in-phase quadrature imbalance (FDIQI) estimates; generating one or more FDIQI estimates based on the one or more signals; and transmitting the one or more FDIQI estimates to a network node.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

DETAILED DESCRIPTION

Figure 1:
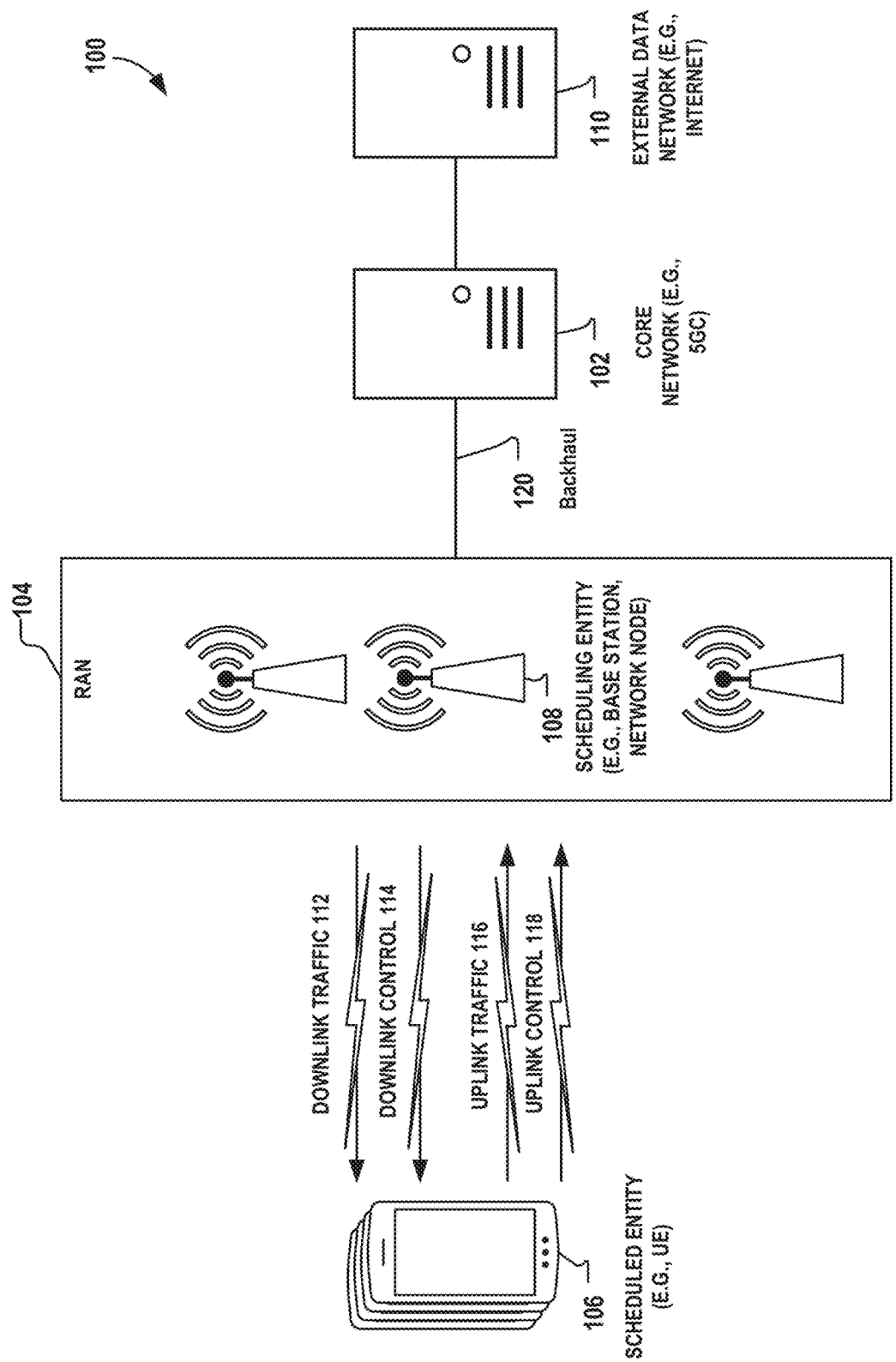
FIG. 1 is a schematic illustration of a wireless communication system according to some aspects of this disclosure.

A wireless communication system includes a network node (e.g., gNb or base station), one or more radio units (RUs), and one or more user equipments (UEs). Each of the RUs may receive data from and transmit data to the network node, and may receive data from and transmit data to one or more UEs. Examples of RUs include transmit receive points (TRPs) and remote radio heads (RRHs).

A network node (e.g., gNb or base station) transmits a precoded signal at baseband to each of the RUs. Each of the RUs include a plurality of IQ modulators (e.g., N transmit IQ modulators) that IQ modulate the precoded signal, and transmit the IQ modulated signal to the respective UEs.

IQ imbalance of IQ modulators is an impairment that limits the achievable signal to noise ratio (SNR), and therefore the attainable data rate. In IQ mismatch, in-phase signal and quadrature signal may be out-of-phase by more or less than 90°, and therefore, when the UEs demodulate the IQ signal, there may be errors in the bitstream. One example way in which the IQ imbalance manifests is frequency dependent residual sideband suppression (FDRSB), which is an IQ imbalance where there is a mismatch in the gain and phase of the IQ signal, but where the IQ imbalance varies with frequency. There may be other examples of such frequency dependent IQ imbalance, and the example techniques should not be considered limited to FDRSB. For ease of description, this disclosure describes the example techniques with frequency dependent IQ imbalance (FDIQI).

This disclosure describes example techniques in which the one or more UEs are configured to determine FDIQI estimates for one or more IQ modulators of an RU, and then transmit the FDIQI estimates to a network node, or possibly to the RU. The network node and/or RU may determine compensation filter coefficients for compensating for the FDIQI. In examples where the network node determines the compensation filter coefficients, the network node transmits the compensation filter coefficients to the RU. The RU may be configured to perform the filtering based on the compensation filter coefficients to compensate for the FDIQI on a link used for communicating with the UEs.

The example techniques may allow for determining and correcting FDIQI in ways that reduce complexity and allow for less frequent updates to the compensation filter coefficients. These example advantages are provided for illustration purposes only, and should not be considered as required. As an example, for next-generation wireless communication, the number of transmit antennas in the RUs is increasing. For each antenna, there may be respective IQ modulators, and therefore, the number of IQ modulators is increasing. In some examples, the FDIQI may be on a per-IQ modulator basis, and therefore, an increase the number of the IQ modulators, results in an increase in the number of filters and the compensation filter coefficients needed to compensate for the FDIQI. For instance, each link includes its own upconverter chain, and thus requires its own FDIQI correction.

In one or more examples, the UEs determining an estimate of the FDIQI may result in less complex operations, as compared to other components estimating the FDIQI. For example, if the network node or RUs estimate the FDIQI, there may be computations that require an RF feedback chain for each IQ modulator, which can be complex and time consuming. As an example, for the network node or RUs to determine the FDIQI, the network node or RUs may need the following RF chain. The network node or RUs may require automatic gain control circuitry, two down converters to move I and Q signals to the baseband, two low pass filters (e.g., one for each of the I and Q signals), and an analog to digital converter. In one or more examples, the UEs may already include such circuitry to perform the example operations, and therefore, would increase complexity to offload such operations to the network node or RUs.

Also, each of the RUs may be configured to perform the FDIQI filtering (e.g., communicate with a UE utilizing a link that are compensated by the one or more FDIQI compensation filters). If the FDIQI compensation (e.g., correction) is performed at the network node or the UEs, then there may be frequent updates of the FDIQI estimate and compensation filter coefficients. For instance, the FDIQI compensation at the network node or UEs may be a composite FDIQI compensation, rather than on a per-IQ modulator basis. The composite FDIQI for which there is composite FDIQI compensation may change every time there is a change in the precoder coefficients of the signal that the network node generates. These precoder coefficients may change frequently, and therefore, FDIQI compensation at the UEs or the network node may result in frequent determination of the FDIQI estimate and FDIQI compensation filter coefficients, without sufficient benefit of reduction in FDIQI.

By the UEs determining the estimate of the FDIQI, there may be computational savings because the complex computations requiring an RF feedback chain for each IQ modulator may not be needed. Also, by performing the FDIQI compensation at the RU, it may be possible to update the FDIQI estimate and FDIQI compensation filter coefficients less frequently, which can reduce delay in throughput.

In the above examples, the UEs are configured to determine the FDIQI estimate. However, not all UEs may be capable of determining the FDIQI estimate, or some of the UEs may be capable of determining a limited number of FDIQI estimates. For example, a UE may be in communication with a RU that includes a plurality of IQ modulators. The UE may not be able to determine an FDIQI estimate for any of the IQ modulators, or may be configured to determine an FDIQI estimate for a M number of IQ modulators, where M is less than the N number of IQ modulators in the RU.

In one or more examples, the network node may output a capability inquiry for generating one or more FDIQI estimates, and the UEs may receive the capability inquiry for generating the one or more FDIQI estimates. A UE of the UEs may transmit information indicative of the capability for generating the one or more FDIQI estimates. As one example, the information indicative of the capability for generating the one or more FDIQI estimates includes information indicative of a maximum number of FDIQI estimates that the UE is configured to generate. The network node may be configured to receive respective capability information of the one or more UEs to generate FDIQI estimates.

The network node may determine a scheduling when the UEs should determine respective FDIQI estimates, and how many FDIQI estimates each UE should determine. The network node may message the decision to the UEs and inform the UEs of a resource at which a training signal will arrive so that the UEs can determine the FDIQI estimates during the determined slot. For example, the network node may be configured to determine scheduling of resources for the UEs to determine the one or more FDIQI estimates that the network node is to receive. Also, the network node may determine a number of FDIQI estimates that each UE of one or more UEs is to transmit based on capability information of the one or more UEs to generate FDIQI estimates, and cause transmission of the determined number from the one or more UEs. To receive the one or more FDIQI estimates from the UEs, the network node may be configured to receive the one or more FDIQI estimates from the one or more UEs based on the respective determined number of FDIQI estimates that each UE is to transmit.

Accordingly, for the network node, the network node may cause transmission of one or more signals (e.g., training signals) for a frequency dependent in-phase quadrature imbalance (FDIQI) estimate to one or more user equipments (UEs), and receive one or more FDIQI estimates from the UEs for one or more radio units (RUs). For instance, the network node may determine how many FDIQI estimates each UE is to determine, and a set of resources for which the UEs are to determine the FDIQI estimates that the network node communicates to the UEs. The network node may receive the one or more FDIQI estimates based on number of FDIQI estimates each of the UEs was to determine and the timing when the FDIQI estimates were determined.

In some examples, to determine how many FDIQI estimate each UE is to determine, the network node may receive respective capability information of the one or more UEs to generate FDIQI estimates. For instance, the network node may be configured to transmit respective capability inquiries to the one or more UEs inquiring capability of the one or more UEs to generate the FDIQI estimates. To receive the respective capability information, the network node may be configured to receive the respective capability information in response to the transmission of the respective capability inquiries.

The network node may generate information for one or more FDIQI compensation filter coefficients based on the one or more FDIQI estimates, and transmit the information for the one or more FDIQI compensation filter coefficients to the one or more RUs that are in communication with the one or more UEs. The RUs may be configured to receive, from the network node, information for coefficients for one or more FDIQI compensation filters. The RUs may communicate with a UE utilizing a link that is compensated by the one or more FDIQI compensation filters.

From the perspective of the UE, the UE may receive one or more signals (e.g., training signals) for generating FDIQI estimates. The UE may generate one or more FDIQI estimates based on the one or more signals. As one example, the UE may receive a request for the one or more FDIQI estimates (e.g., including a resource with which the UE is to generate and transmit the one or more FDIQI estimates). To generate the one or more FDIQI estimates, the UE may be configured to generate the one or more FDIQI estimates in response to the request for the one or more FDIQI estimates.

As one example, the UE may receive a capability inquiry (e.g., from the network node) for generating the one or more FDIQI estimates. The UE may determine its capability for generating the one or more FDIQI estimates, and transmit information indicative of the capability for generating the one or more FDIQI estimates (e.g., back to the network node using the scheduled resource). In such examples, for the request for the one or more FDIQI estimates, the UE may be configured to receive the request including information indicative of a number of FDIQI estimates to generate, in response to the transmitted information indicative of the capability for generating the one or more FDIQI estimates.

The UE may transmit the one or more FDIQI estimates to a network node. Then, the UE may receive a subsequent signal (e.g., IQ modulated data signal) generated based on the FDIQI estimate. For instance, the network node may determine FDIQI compensation filter coefficients that the network node transmits to the RU. The RU implements the FDIQI compensation filters based on the compensation filter coefficients, and the result may be the RU communicating with the UE utilizing a link that is compensated by the one or more FDIQI compensation filters.

As described above, the capability of each UE in generating a number of FDIQI estimates may be different. For example, the UE may be in communication with a RU. To receive the one or more signals (e.g., training signals), the UE may be configured to receive a first signal (e.g., first training signal) from a first IQ modulator of the RU and receive a second signal (e.g., second training signal) from a second IQ modulator of the RU. In this example, to generate the one or more FDIQI estimates, the UE may be configured to generate a first FDIQI estimate for the first IQ modulator based on the first signal and generate a second FDIQI estimate for the second IQ modulator based on the second signal.

However, in another example, the UE may determine FDIQI estimates for a limited number of IQ modulators of the RU. For example, to receive the one or more signals (e.g., training signals), the UE may be configured to receive a signal (e.g., training signal) from a first IQ modulator of the RU. To generate the one or more FDIQI estimates, the UE may be configured to generate an FDIQI estimate for the first IQ modulator based on the signal and avoid generating an FDIQI estimate for a second IQ modulator of the RU.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology. In this disclosure, the term "network node" is used as an example of base station 108.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., network node 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity 108.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. The UEs 106 may send uplink (UL) control information 118 to network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In one or more examples, downlink traffic 112 is a data stream that is modulated according to one of various modulation schemes. One example of a modulation scheme is a in-phase (I)/quadrature (Q) modulation, or simply IQ modulation. For IQ modulation, network node 108, which may include one or more radio units (RUs), described in more detail below, include one or more (e.g., N number) of IQ modulators that output to respective antennas (e.g., N antennas coupled to respective ones of the N IQ modulators). Each of the RUs communicates with one or more UEs (e.g., like UE 106) via the one or more antennas.

As described above, the IQ modulators are configured to modulate an in-phase carrier signal and a 90° out-of-phase carrier signal with a data signal to generate a first signal (e.g., in-phase signal) and a second signal (e.g., quadrature signal) that are summed together. In some cases, environment conditions or aging (e.g., slow changing factors) can impact operation of the IQ modulators, such as causing imbalance between the in-phase and quadrature signals. This imbalance may also be frequency dependent. This disclosure uses the term frequency-dependent IQ imbalance (FDIQI) to describe such frequency dependent imbalance between the in-phase and quadrature signals. One example of FDIQI is frequency dependent residual sideband suppression (FDRSB).

In accordance with one or more examples described in this disclosure, the UEs, like UE 106, may be configured to determine FDIQI estimates for one or more IQ modulators of a RU, and transmit the FDIQI estimates to network node 108. Network node 108 may determine FDIQI compensation filter coefficients for FDIQI compensation filters implemented by respective RUs based on received FDIQI estimates from respective UEs. The RUs may then perform filtering in accordance with the compensation filter coefficients to communicate with respective UEs utilizing a link that is compensated by one or more FDIQI compensation filters.

Figure 2:
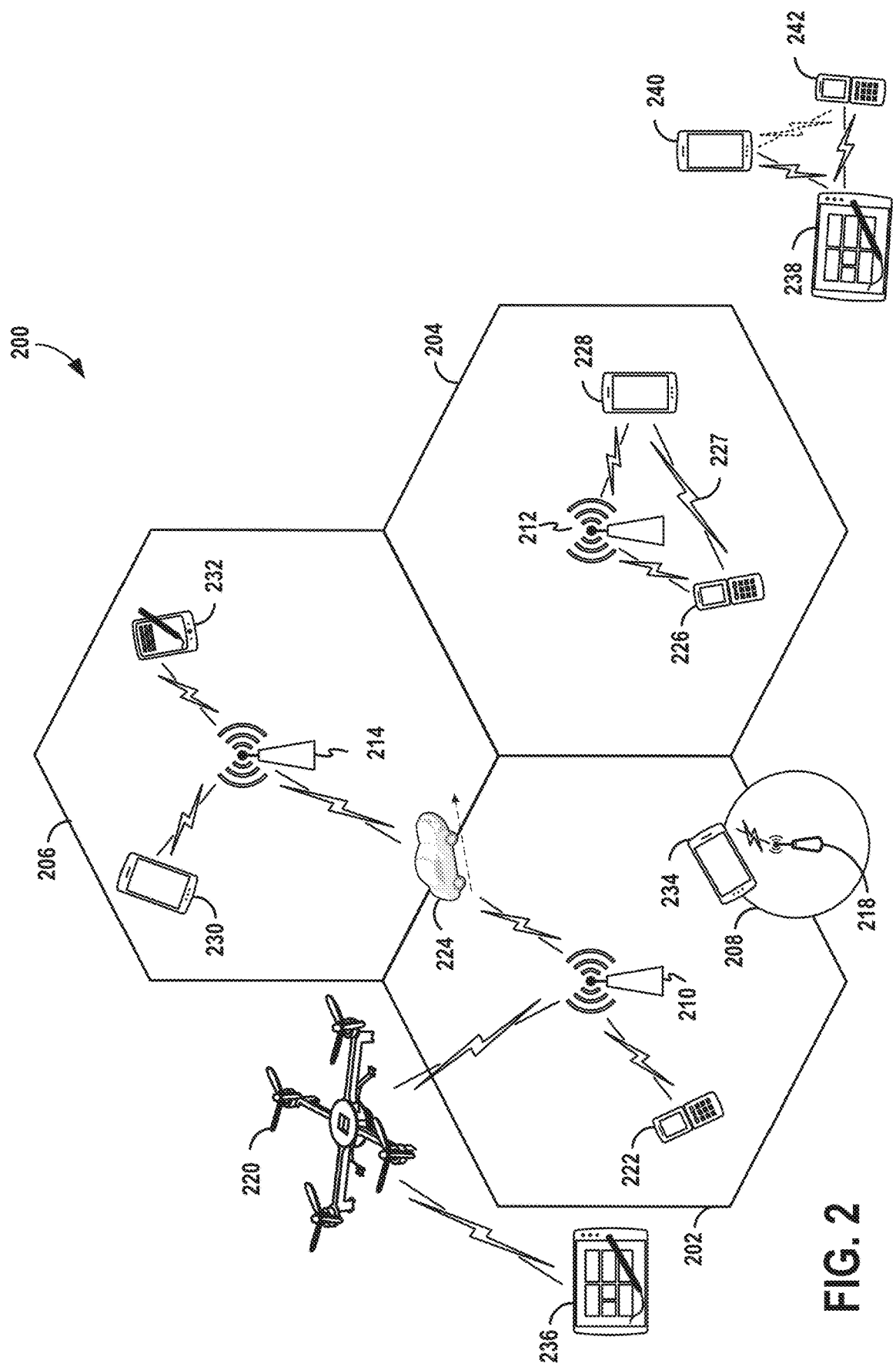
FIG. 2 is a conceptual illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the base station/scheduling entity 108 described above and illustrated in FIG. 1.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, gNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The example techniques described in this disclosure may operate in an aggregated RAN architecture or a disaggregated RAN architecture. For example, network nodes 210, 214, or 212 may include gNb node and one or more RUs, as separate components (e.g., for disaggregated RAN architecture), or may be combined (e.g., for aggregated RAN architecture). For ease of description only, and not limitation, the example techniques are described with respect to a network node (e.g., the one or more DUs, CUs, a combination of DUs and CUs, or another component of a gNb) performing one or more example techniques, and one or more RUs performing one or more example techniques. However, such examples are merely provided as illustration and should not be interpreted to imply a particular architecture. In examples of an aggregated architecture, the example techniques described for the one or more RUs and a network node may be combined into a network node. For instance, in examples where a network node transmits or outputs to one or more RUs, such description should be interpreted to mean that, in an aggregated architecture, the information generated within the network node is available to the components of the network node that form the one or more RUs (e.g., the information from the one or more DUs, CUs, combination thereof, or another component of the gNb is available to the one or more RUs). In examples where a network node transmits or outputs to one or more RUs, such description should be interpreted to mean that, in a disaggregated architecture, the information generated within the network node is transmitted (e.g., wirelessly or through wired link) to the one or more RUs (e.g., the one or more DUs, CUs, combination thereof, or another component of the gNb transmit to the one or more RUs).

In any event, for network nodes 210, 214, or 227, the network nodes and RUs may communicate with a fronthaul link. The network nodes may transmit (or otherwise make available) samples to the one or more RUs that are to be broadcast to UEs 222, 224, 226, 228, 230, 232, 234, 236, 238, 240, and/or 242. The samples from the network nodes to the RUs may be at baseband, and the fronthaul link may be designed to operate at a very low bit error rate (BER). For instance, BER between the network nodes and RUs may be in less than 10-12.

The one or more RUs may modulate (e.g., IQ modulate) the samples from the network nodes and transmit as shown in the example of FIGS. 1 and 2. As described above, the IQ modulated signal may suffer from IQ imbalance, that can also be frequency dependent (i.e., FDIQI). In accordance with one or more examples described in this disclosure, UEs 222, 224, 226, 228, 230, 232, 234, 236, 238, 240, and/or 242 may be configured to determine an FDIQI estimate for one or more IQ modulators of an RU, and transmit the FDIQI estimate to the network node (e.g., one or more DUs). The one or more network nodes may determine FDIQI compensation filter coefficients for FDIQI compensation filters implemented by the one or more RUs. For subsequent communication, the one or more RUs may implement the FDIQI compensation filters based on the FDIQI compensation filter coefficients to compensate for the FDIQI.

Figure 3:
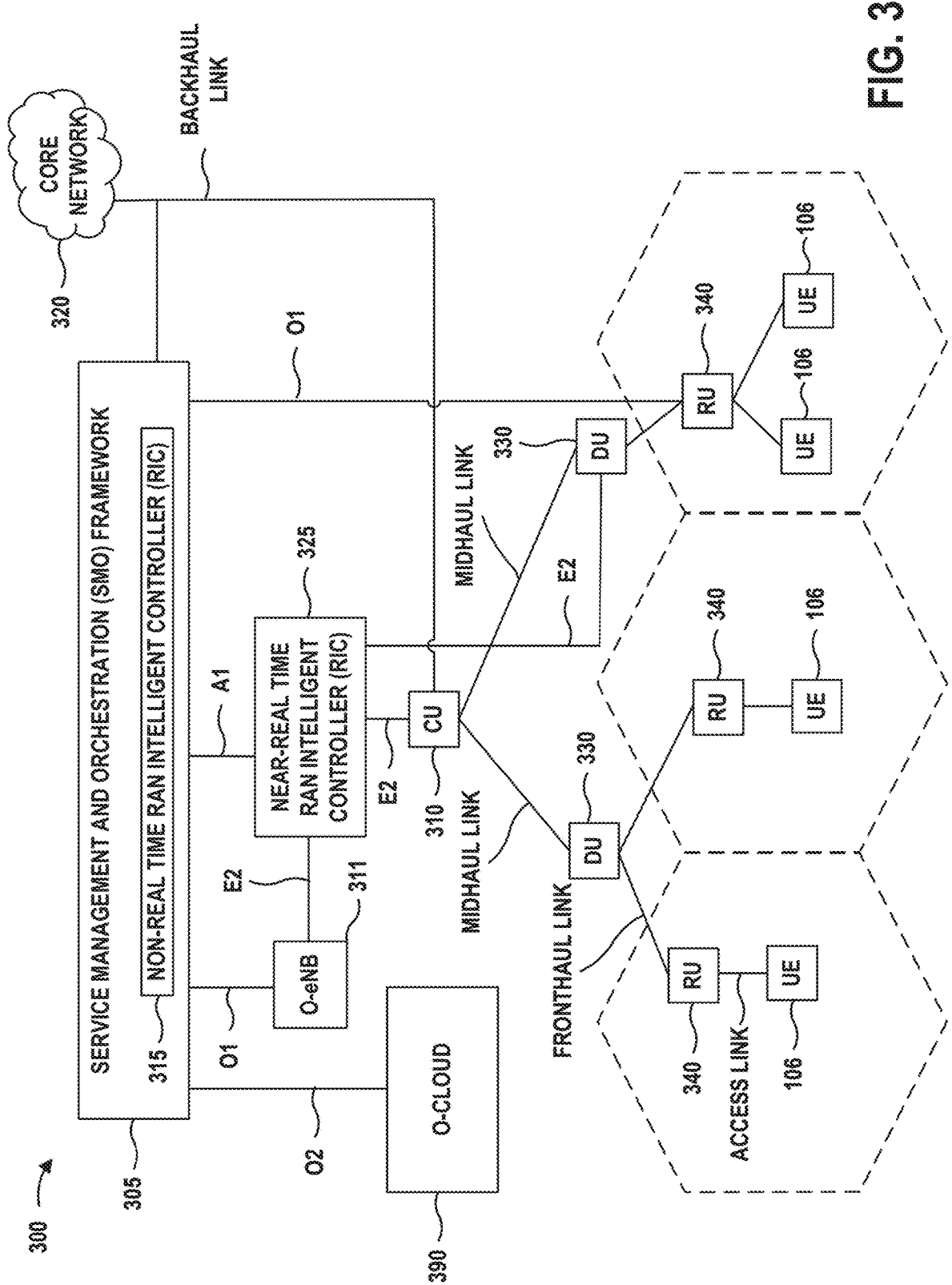
FIG. 3 is a block diagram illustrating a wireless communication system supporting multiple-input multiple-output (MIMO) communication according to some aspects of this disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 106 via one or more radio frequency (RF) access links. In some implementations, the UE 106 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3 rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 106. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

One or more RUs 340 include a plurality of IQ modulators that are configured to modulate the signals received from respective DUs 330 via respective fronthaul links for transmission to respective UEs 106. The IQ modulators may suffer from IQ imbalance that manifests as FDIQI, limiting the attainable data rate due to reduced achievable signal to noise ratio (SNR).

To compensate for the FDIQI, a FDIQI estimate (e.g., an estimate of an amount of FDIQI in a downstream signal) may be desired for generating FDIQI compensation filter coefficients for FDIQI compensation filters. In one or more examples, UEs 106 may be configured to determine the FDIQI estimates, network nodes (e.g., via DUs 330, CUs 310, combination of one or more DUs 330 and one or more CUs 310, or another component of a gNb) may be configured to determine the FDIQI compensation filter coefficients, and RUs 340 may be configured to apply the FDIQI compensation filters with the FDIQI compensation filter coefficients.

In one or more examples, UEs 106 may be configured to determine the FDIQI estimate. In some cases, it may be possible that the complexity to determine the FDIQI estimate at network nodes or RUs 340 may be relatively high. For example, for each IQ modulator, there may be a feedback signal to determine the FDIQI for the IQ modulator. As the number of IQ modulators may be relatively large, the number of feedback chains may be relatively large. Therefore, there may be reduction in complexity by offloading the determination of the FDIQI estimate to UEs 106. Accordingly, in one or more examples, one of UEs 106 may estimate FDIQI for all or part of one of the RUs 340 with which the UE 106 is communicating.

Although the UEs 106 may be tasked with determining the FDIQI estimates, it may be possible that some UEs 106 are incapable of determining the FDIQI estimates. Moreover, even if a UE 106 is capable of determining FDIQI estimates, there may be a limit of how many FDIQI estimates the UE 106 can determine (i.e., there may be limit on the dimensions of estimation). Also, there may be resources allocated (e.g., timeslot allocation) and training signals that the UEs 106 that are capable of determining FDIQI estimates use to determine the FDIQI estimates.

In one or more examples, a network node (e.g., via DUs 330, CUs 310, combination of one or more DUs 330 and one or more CUs 310, or another component of a gNb) may be configured to cause transmission (e.g., via RUs 340) of respective capability inquiries to the one or more UEs 106 inquiring capability of the one or more UEs 106 to generate the FDIQI estimates. In some examples, the capability inquires may specify which ones of the one or more UEs 106 support a desired resolution (referred to as FD_resolution_gNb). The resolution refers to how dense the estimation is. If the resolution is one, this is means that the FDIQI is estimated for each sub-carrier. In examples, where the circuitry of a UE 106 may support performing limited mathematical operations, there may be an increase in the resolution in order to reduce the number of estimated parameters.

The network nodes may receive respective capability information of the one or more UEs 106 to generate FDIQI estimates. For example, the network nodes may be configured to receive the respective capability information of the one or more UEs 106 in response to the transmission of the respective capability inquiries.

Correspondingly, one or more UEs 106 may receive a capability inquiry for generating the one or more FDIQI estimates. One or more UEs 106 may determine their capability for generating the one or more FDIQI estimates, and transmit information indicative of the capability for generating the one or more FDIQI estimates. One or more UEs 106 may determine their capability of generating the one or more FDIQI estimates based on various factors, such as number of receive antennas, the desired resolution, and a number of training symbols that are used for determining the FDIQI estimates. In some examples, the information indicative of the capability for generating the one or more FDIQI estimates may be information indicative of a maximum number of FDIQI estimates the UEs 106 are configured to generate.

For example, the capability for generating the one or more FDIQI estimates may be represented as follows:

$$N\_fdrsb\_capability < (n_{rx})(n_{trainingsysmbols})(FD\_resolution\_gNb),$$

where N_fdrsb_capability is the maximum number of FDIQI estimates that a particular UE 106 can generate, $n_{rx}$ is the number of receive antennas for the particular UE 106, $n_{trainingsymbols}$ is the number of training symbols used for FDIQI estimation, and FD_resolution_gNb is a desired resolution determined by the network nodes.

In one or more examples, network nodes may determine a number of FDIQI estimates that each UE 106 of one or more UEs 106 is to transmit based on capability information of the one or more UEs 106 to generate FDIQI estimates. The network nodes may cause transmission of the determined number to the one or more UEs For example, assume that a first UE of UEs 106 indicated in the capability information that the first UE has capability to determine the FDIQI estimates for multiple IQ modulators of a RU 340 with which the first UE communicates. In this example, the network node may determine that the first UE should determine a first FDIQI estimate for a first IQ modulator of the RU 340, and a second FDIQI estimate for a second IQ modulator of the same RU 340. The network node may cause transmission to the first UE to determine the FDIQI estimate for both the first and second IQ modulators of the RU 340.

As another example, assume that a second UE of UEs 106 indicated in the capability information that the second UE has capability to determine the FDIQI estimates for only one IQ modulator of a RU 340 with which the second UE communicates. In this example, the network node may determine that the second UE should determine a first FDIQI estimate for a first IQ modulator of the RU 340, but another UE should determine a second FDIQI estimate for a second IQ modulator of the RU 340. That is, due to the limited capabilities of the second UE in determining FDIQI estimates (e.g., such as based on limited number of receive antennas), the second UE may not be able to determine the FDIQI estimates for all IQ modulators of RU 340. Instead, the network node may determine that another UE, in addition to the second UE, should be used to determine the FDIQI estimates for the IQ modulators of RU 340. In this example, the network node may cause transmission to the second UE to determine one FDIQI estimate (e.g., for the first IQ modulator).

Correspondingly, UEs 106 may receive a request for one or more FDIQI estimates. For instance, UEs 106 may receive the request including information indicative of a number of FDIQI estimates to generate, such as in response to the transmitted information indicative of the capability of generating the one or more FDIQI estimates.

To perform the FDIQI estimate, DUs 330 may be configured to determine scheduling resources for the UEs 106 to determine the one or more FDIQI estimates that DUs 330 are to receive. UEs 106 may receive information indicative of a resource (e.g., training signal that the UEs should monitor to determine the FDIQI estimates). UEs 106 may also receive a resource on which UEs 106 should transmit the FDIQI estimates. As one example, the network nodes may determine a timeslot during which time UEs 106 should determine and transmit the FDIQI estimates that each of UEs 106 are assigned to determine. The network nodes may cause transmission of one or more training signals and timeslot information to UEs 106, and in turn, UEs 106 may determine and transmit respective FDIQI estimates during respective timeslots.

During respective scheduled resources, the network nodes may cause transmission of one or more signals (e.g., training signals) for FDIQI estimation to one or more UEs 106. Correspondingly, UEs 106 may receive one or more signals (e.g., training signals) for determining FDIQI estimates. Examples of the training signals are illustrated below. The signals that are used for FDIQI estimation are described as training signals, but the example techniques should not be considered limiting. For instance, the signals that are used for FDIQI estimation need not necessarily be used exclusively for training, and may include actual data. In other words, a data stream that includes actual data may also be used to determine FDIQI estimates.

UEs 106 may generate one or more FDIQI estimates based on the one or more signals (e.g., training signals). For example, UEs 106 may receive a request for the one or more FDIQI estimates (e.g., from the network nodes). To generate the one or more FDIQI estimates, the UEs 106 may be configured to generate the one or more FDIQI estimates in response to the request for the one or more FDIQI estimates. The request for the one or more FDIQI estimates may also include information indicative of a number of FDIQI estimates to generate. That is, the network nodes may have determined a number of FDIQI estimates that a particular one of UEs 106 should generate, and transmit that number to the particular one of UEs 106 as part of the request for that UE of UEs 106 to generate the one or more FDIQI estimates.

UEs 106 may transmit the one or more FDIQI estimates to a network node. Correspondingly, the network node may receive one or more FDIQI estimates from the one or more UEs 106 for the one or more RUs 340.

In one or more examples, the network nodes may generate information for one or more FDIQI compensation filter coefficients based on the one or more FDIQI estimates. Example ways in which to determine the FDIQI compensation filter coefficients are described below. In some examples, the network nodes may receive multiple FDIQI estimates for the same one of RUs 340, such as where an RU 340 communicates with multiple UEs 106. It may be possible that there are multiple FDIQI estimates from the same IQ modulator within one RU 340. In one or more examples, the network nodes may average, including weighted average such as based on SNR, or perform some other computation on the FDIQI estimates to generate information for FDIQI compensation filter coefficients for a particular IQ modulator within an RU 340. For instance, different UEs 106 may be different distances from RU 340 that are communicating with RU 340. Therefore, multiple UEs 106 may generate FDIQI estimates for the same RUs 340 but from different distances. Accordingly, the network nodes may average, or perform some other computation, of the FDIQI estimates as part of determining the FDIQI compensation filter coefficients.

The network nodes may transmit the information for the one or more FDIQI compensation filter coefficients to the one or more RUs 340 that are in communication with the one or more UEs 106. Correspondingly, RUs 340 may receive, from a network node, information for coefficients for one or more FDIQI compensation filters (i.e., FDIQI compensation filter coefficients). RUs 340 may then apply the FDIQI compensation filters using the FDIQI compensation filter coefficients, and communicate with UEs 106 utilizing a link that is compensated by the one or more FDIQI compensation filters. For instance, an RU 340 may include at least one antenna and at least one IQ modulator coupled to the at least one antenna. To communicate with UEs 106, RUs 340 may apply the one or more FDIQI compensation filters to a signal that is modulated by the at least one IQ modulator and transmitted by the at least one antenna.

UEs 106 may receive a subsequent signal generated based on the FDIQI estimate. For example, the subsequent signals that UEs 106 receive may be FDIQI compensated signals, where the FDIQI compensation is performed by RUs 340 using FDIQI compensation filters, and where the FDIQI compensation filter coefficients for the FDIQI compensation filters are determined by the network nodes based on the FDIQI estimates transmitted by respective UEs 106.

In one or more examples, division of the tasks for FDIQI compensation as described in this disclosure may reduce complexity and reduce number of times FDIQI compensation filter coefficients are generated, which can reduce latency and improve power consumption of UEs 106. For example, as described above, due to the relatively large number of feedback chains, there may be benefit to offload the FDIQI estimates to UEs 106.

Also, if UEs 106 were to determine the FDIQI compensation filter coefficients, the power consumption of UEs 106 may increase. Moreover, to determine the FDIQI compensation filters, UEs 106 may need to perform an iterative process, where the UEs 106 iteratively remove the FDIQI, and slowly increase the BER. This may result in increased complexity and power usage, but may also impact latency, as it will take longer to reach the desired SNR due to the iterative process.

Moreover, if a network node were to perform the FDIQI compensation, such compensation may require frequent updates to the FDIQI compensation filter coefficients. For example, the network node may be configured to transmit a precoded signal to RUs 340. This precoded signal may be based on precoding coefficients, which can change frequently. In some cases, every time the precoding coefficients change, the network node may cause a refresh of the FDIQI compensation filter coefficients. For instance, the FDIQI compensation done at the network node may be a composite FDIQI compensation, because the FDIQI compensation would be applicable for all RUs 340, and not individualized for each IQ modulator of each one of RUs 340. The composite FDIQI compensation may be dependent upon the precoder coefficients. Accordingly, where there is a change in precoder coefficients, the network node may trigger a refresh of the FDIQI estimates and generating of the FDIQI compensation filter coefficients, which can increase latency.

In one or more examples, RUs 340 may be configured to apply the FDIQI compensation filters based on the FDIQI compensation filter coefficients. Therefore, the refreshing of the FDIQI compensation filter coefficients may be independent of changes in the precoder coefficients at the network node. This allows for a low refresh rate of the FDIQI compensation filter coefficients. For example, the FDIQI may vary slowly because of temperature or aging, but may be otherwise static. In one or more examples, RUs 340 may transmit a refresh request to the network node requesting a refresh of the coefficients for the one or more FDIQI compensation filters.

As one example, RUs 340 may transmit temperature information to the network nodes that causes a refresh of the FDIQI compensation filter coefficients. For instance, if the network nodes determine that the change in temperature is large enough from a previous temperature, the network nodes may trigger a refresh of the FDIQI compensation filter coefficients. In some examples, rather than the network nodes determining that the temperature has sufficiently changed, RUs 340 may determine that the temperature has sufficiently changed, and transmit a refresh request to the network nodes requesting a refresh of the FDIQI compensation filter coefficients (e.g., cause transmission of training signal, receive FDIQI estimates from UEs 106, and generate FDIQI compensation filter coefficients).

As another example, the network nodes may determine if a threshold time has passed between a current time and a previous time at which FDIQI compensation filter coefficients were updated. If the threshold time has passed, the network nodes may trigger a refresh of the FDIQI compensation filter coefficients.

In this way, the example techniques may promote low refresh rate for the estimation and update of the FDIQI compensation filter coefficients. For instance, an update of the FDIQI compensation filter coefficients may occur when there is sufficient change in temperature or when sufficient time has passed, which may be relatively infrequent.

Moreover, in one or more examples, not all UEs 106 may need to participate in generating FDIQI estimates. For instance, the network nodes may determine which ones of UEs 106 are to generate FDIQI estimates, and a number of FDIQI estimates that the ones of UEs 106 are to generate. In some cases, it may be possible that even if a particular UE has the capability of generating FDIQI estimates, that that particular UE may not be selected as one of the UEs 106 that is to generate FDIQI estimates. However, even though that particular UE did not contribute to the generation of FDIQI estimates, that particular UE may still receive FDIQI compensated signals. Also, UEs 106 that are generating FDIQI estimates may generate FDIQI estimates for a subset of the IQ modulators (e.g., transmit antennas) on a RU 340 rather than for all IQ modulators because other UEs 106 may be generating the FDIQI estimates for the remaining IQ modulators on the same RU 340. Accordingly, even for UEs 106 that are generating FDIQI estimates, the power consumption by those UEs 106 may reduced since the UEs 106 are sharing the task of generating FDIQI estimates.

Figure 4:
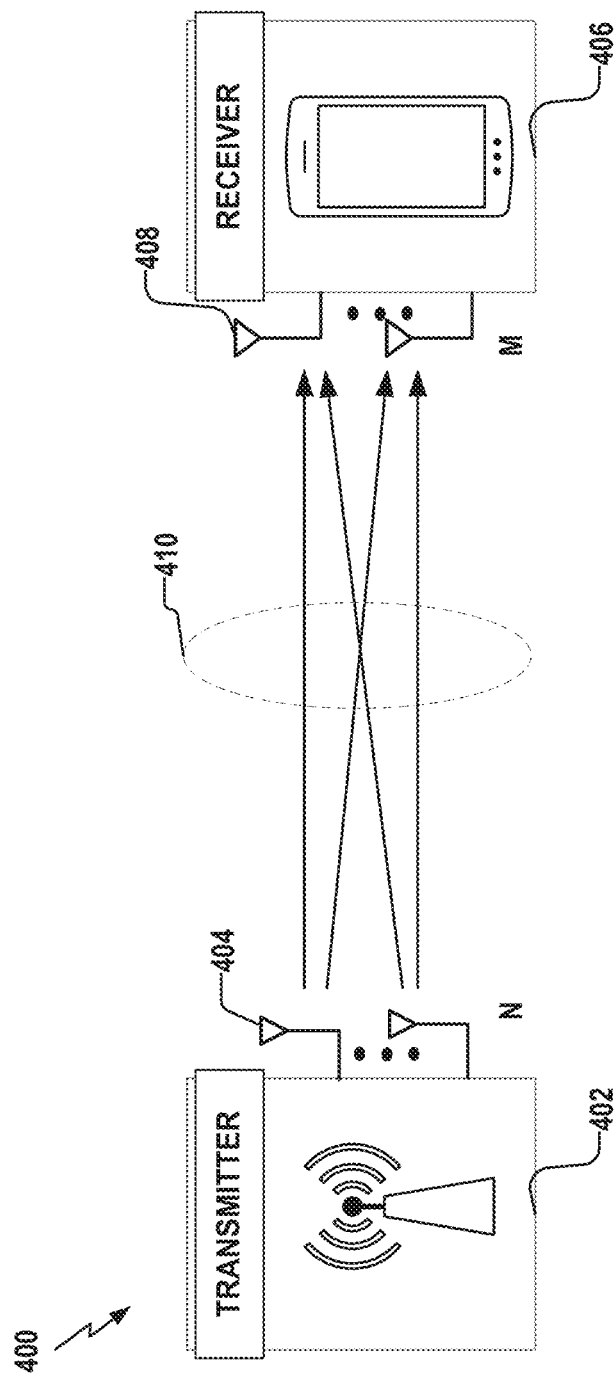
FIG. 4 is a schematic illustration of an organization of wireless resources in an air interface utilizing orthogonal frequency divisional multiplexing (OFDM) according to some aspects of this disclosure.

In some aspects of the disclosure, a network node and/or UE may be configured with multiple antennas for beamforming and/or multiple-input multiple-output (MIMO) technology. FIG. 4 illustrates an example of a wireless communication system 400 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

In accordance with one or more examples, one or more, including all, transmit antennas 404 may be coupled to IQ modulators that IQ modulate a signal that antennas 404 transmit. The IQ modulators may suffer from FDIQI. Similar to the description above, receiver 406 may be configured to generate FDIQI estimates that transmitter 402 (e.g., with scheduling entity) may use to determine FDIQI compensation filter coefficients that transmitter 402 applies prior to the IQ modulators modulating the signal. In this manner, the FDIQI may be compensated in the signal that antennas 404 transmit.

Also, in some examples, receiver 406 may transmit information indicative of the capability of receiver 406 to generate the FDIQI estimates. The capability of receiver 406 generating the FDIQI estimates may be based on the number of receive antennas (e.g., M receive antennas) of receiver 406.

In a MIMO system, spatial multiplexing may be used to transmit multiple different streams of data, also referred to as layers, simultaneously on the same time-frequency resource. In some examples, a transmitter 402 may send multiple data streams to a single receiver. In this way, a MIMO system takes advantage of capacity gains and/or increased data rates associated with using multiple antennas in rich scattering environments where channel variations can be tracked. Here, the receiver 406 may track these channel variations and provide corresponding feedback to the transmitter 402. In one example case, as shown in FIG. 4, a rank-2 (i.e., including 2 data streams) spatial multiplexing transmission on a 2×2 MIMO antenna configuration will transmit two data streams via two transmit antennas 404. The signal from each transmit antenna 404 reaches each receive antenna 408 along a different signal path 410. The receiver 406 may then reconstruct the data streams using the received signals from each receive antenna 408.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency and reducing the required transmission energy. This is achieved by a transmitter 402 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 406) may transmit feedback including a quantized version of the channel so that the transmitter 402 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 404 or 408, whichever is lower. In addition, the channel conditions at the receiver 406, as well as other considerations, such as the available resources at the transmitter 402, may also affect the transmission rank. For example, a network node in a RAN (e.g., transmitter 402) may assign a rank (and therefore, a number of data streams) for a DL transmission to a particular UE (e.g., receiver 406) based on a rank indicator (RI) the UE transmits to the network node. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The network node may use the RI along with resource information (e.g., the available resources and amount of data to be scheduled for the UE) to assign a DL transmission rank to the UE.

The transmitter 402 determines the precoding of the transmitted data stream or streams based, e.g., on known channel state information of the channel on which the transmitter 402 transmits the data stream(s). For example, the transmitter 402 may transmit one or more suitable reference signals (e.g., a channel state information reference signal, or CSI-RS) that the receiver 406 may measure. The receiver 406 may then report measured channel quality information (CQI) back to the transmitter 402. This CQI generally reports the current communication channel quality, and in some examples, a requested transport block size (TBS) for future transmissions to the receiver. In some examples, the receiver 406 may further report a precoding matrix indicator (PMI) to the transmitter 402. This PMI generally reports the receiver's 406 preferred precoding matrix for the transmitter 402 to use, and may be indexed to a predefined codebook. The transmitter 402 may then utilize this CQI/PMI to determine a suitable precoding matrix for transmissions to the receiver 406.

In Time Division Duplex (TDD) systems, the UL and DL may be reciprocal, in that each uses different time slots of the same frequency bandwidth. Therefore, in TDD systems, a transmitter 402 may assign a rank for DL MIMO transmissions based on an UL SINR measurement (e.g., based on a sounding reference signal (SRS) or other pilot signal transmitted from the receiver 406). Based on the assigned rank, the transmitter 402 may then transmit a channel state information reference signal (CSI-RS) with separate sequences for each layer to provide for multi-layer channel estimation. From the CSI-RS, the receiver 406 may measure the channel quality across layers and resource blocks. The receiver 406 may then transmit a CSI report (including, e.g., CQI, RI, and PMI) to the transmitter 402 for use in updating the rank and assigning resources for future DL transmissions.

Figure 5:
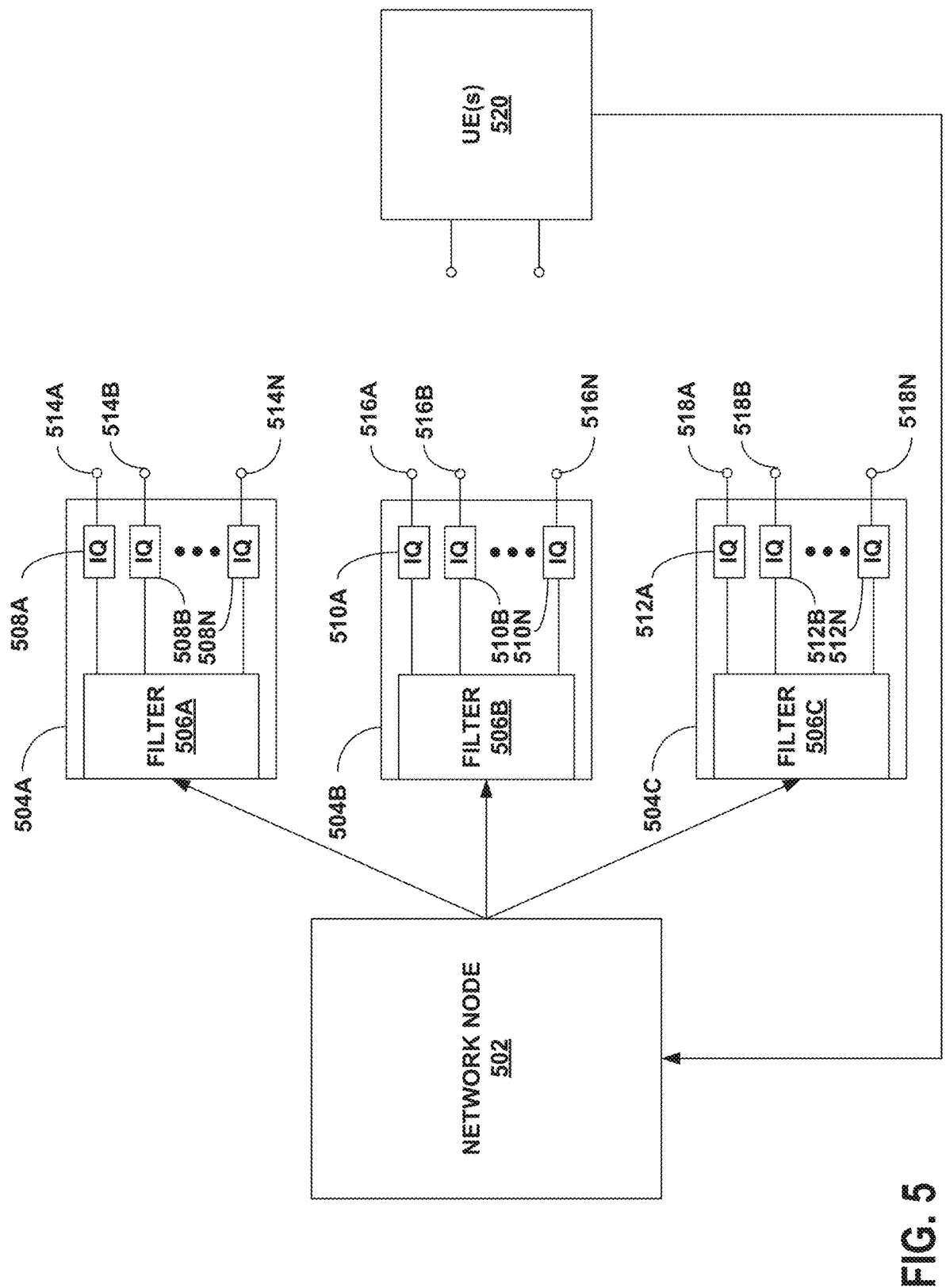
FIG. 5 is a schematic illustration of a wireless communication system that includes a network node, a plurality of radio units (RUs), and one or more user equipments (UEs).

FIG. 5 is a schematic illustration of a wireless communication system that includes a network node, a plurality of radio units (RUs), and one or more user equipments (UEs). FIG. 5 illustrates network node 502, which is an example of network node 108 and/or DUs 330, CUs 310, a combination of DUs 330 and CUs 310, RUs 504A-504C, which are examples of RUs 340, and one or more UEs 520, which are examples of UEs 106. It should be understood that the term "network node" as used in FIG. 5 is a term used to indicate a node that performs the example operations of DUs 330, CUs 310, a combination of DUs 330 and CUs 310, another component of a gNb, or any combination of such components in FIG. 3.

RU 504A includes FDIQI compensation filter 506A and IQ modulators 508A-508N that output to one or more transmit antennas 514A-514N, which are similar to transmit antennas 404. RU 504B includes FDIQI compensation filter 506B and IQ modulators 510A-510N that output to one or more transmit antennas 516A-516N, which are similar to transmit antennas 404. RU 504B includes FDIQI compensation filter 506N and IQ modulators 512A-512N that output to one or more transmit antennas 518A-518N, which are similar to transmit antennas 404.

In the example of FIG. 5, one or more UEs 520 may be in communication with at least one of the RUs 504A-504N, and may be configured to communicate in accordance with MIMO. That is, a first one of UEs 520 may include a plurality of antennas, similar to receiver antennas 408, and may receive and transmit with RU 504A using antennas 514A-514N. A second one of UEs 520 may also communicate with RU 504A, or may communicate with RU 504B. A third one of UEs 520 may communicate with RU 504C, and so forth.

To perform FDIQI compensation, in one example, network node 502 may cause transmission of respective capability inquiries (e.g., via respective RUs 504A-504N) to the one or more UEs 520 inquiring capability of the one or more UEs 520 to generate the FDIQI estimates. UEs 520 may receive a capability inquiry for generating the one or more FDIQI estimates, determine capability for generating the one or more FDIQI estimates, and transmit information indicative of the capability for generating the one or more FDIQI estimates. The information indicative of the capability for generating the one or more FDIQI estimates may include information indicative of a maximum number of FDIQI estimates the processor is configured to generate, which may be based on the number of receiver antennas for UES 520.

Network node 502 may receive the respective capability information in response to the transmission of the respective capability inquiries. Network node 502 may determine a number of FDIQI estimates that each UE of one or more UEs 520 is to transmit based on capability information of the one or more UEs 520 to generate FDIQI estimates. Network node 502 may cause transmission of the determined number to the one or more UEs 520.

Additionally, network node 502 may determine scheduling of resources (e.g., timeslots) for UEs 520 to determine the one or more FDIQI estimates that network 502 is to receive. Similarly, UEs 520 may receive information of a resource at which a training signal will arrive so that UEs 520 can determine the FDIQI estimates and a timeslot at which UEs 520 are to transmit the one or more FDIQI estimates.

Network node 502 may cause transmission of one or more signals (e.g., training signals) for FDIQI estimation to one or more UEs 520, and UEs 520 may receive one or more signals (e.g., training signals) for determining FDIQI estimates. One example of the training signal is:

$$s = p \cdot x = \begin{bmatrix} 1 & 0 & 0 & 0 \\ 1 & 0 & 0 & 0 \\ 1 & 0 & 0 & 0 \\ 1 & 0 & 0 & 0 \\ 0 & 1 & 0 & 0 \\ 0 & 1 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 1 & 0 \\ 0 & 0 & 1 & 0 \\ 0 & 0 & 0 & 1 \\ 0 & 0 & 0 & 1 \\ 0 & 0 & 0 & 1 \\ 0 & 0 & 0 & 1 \end{bmatrix} \begin{bmatrix} x_1 \\ x_2 \\ x_3 \\ x_4 \end{bmatrix}$$

In the above example training signal, $s = p \cdot x (\in C^{N_{Tx}*N_{ss}})$, where $N_{Tx}$ refers to the number of transmit antennas (e.g., 514A-514N, 516A-516N, or 518A-518N) of a given one of RUs 504A-504C, $N_{ss}$ refers to the number of data streams, p is a known precoder (e.g., $p \in C^{N_{Tx}*N_{ss}}$), and x is a known pilot signal (e.g., $x \in C^{N_{ss}*1}$). The above is an example where $N_{Tx}=16$ and $N_{ss}=4$.

The knowledge of precoder P and pilot x enables UEs 520 to estimate the physical channel (H). UEs 520 may estimate the FDIQI as a function of p, x, and H and the observing signal at UEs 520 (y). Additional example techniques for determining the FDIQI estimate are described with respect to FIGS. 6A, 6B, and 7.

An example way in which to estimate the physical channel can be as follows. In the following, $k_i$ ($0 \le i \le K$) refers to the set of frequency indexes. $H_{r,t}(k_i)$ refers to the channel coefficient from the $t^{th}$ Tx to the $r^{th}$ Rx at the $k_i$ frequency. $P_{s,t}(k_i)$ refers to the precoding matrix entry from the $s^{th}$ stream to the $t^{th}$ Tx at the $k_i$ frequency. $D_s(k_i)$ refers to the data stream at the $k_i$ frequency.

The obtained signal at the $r^{th}$ receiver without the additive noise can be written as:

$$\chi_r = \begin{pmatrix} x_r(k_1) \\ \vdots \\ x_r(k_K) \end{pmatrix} = \begin{pmatrix} \sum_{t=1}^{T} H_{r,t}(k_1)\Delta_t(k_1) \\ \vdots \\ \sum_{t=1}^{T} H_{r,t}(k_K)\Delta_t(k_K) \end{pmatrix}$$

where, $$(\underline{\Delta}_1 \cdots \underline{\Delta}_T) = (\underline{D}_1 \cdots \underline{D}_s)\begin{pmatrix} \underline{P}_{1,1} & \cdots & \underline{P}_{1,T} \\ \vdots & \ddots & \vdots \\ \underline{P}_{S,1} & \cdots & \underline{P}_{S,T} \end{pmatrix},$$

$$\underline{D}_s \equiv \begin{pmatrix} D_s(k_1) & 0 & \\ 0 & \ddots & 0 \\ & 0 & D_s(k_K) \end{pmatrix}, \underline{P}_{s,t} \equiv \begin{pmatrix} P_{s,t}(k_1) & 0 & \\ 0 & \ddots & 0 \\ & 0 & P_{s,t}(k_K) \end{pmatrix} \Rightarrow \chi_r =$$

$$\sum_{t=1}^{T} \begin{pmatrix} \Delta_t(k_1) & 0 & \ddots \\ 0 & \ddots & 0 \\ \ddots & 0 & \Delta_t(k_K) \end{pmatrix}\begin{pmatrix} H_{r,t}(k_1) \\ \vdots \\ H_{r,t}(k_K) \end{pmatrix} \equiv \sum_{t=1}^{T} \underline{\Delta}_t \underline{H}_{r,t} =$$

$$(\underline{\Delta}_1 \cdots \underline{\Delta}_T)\begin{pmatrix} \underline{H}_{r,1} \\ \vdots \\ \underline{H}_{r,T} \end{pmatrix} \equiv (\underline{D}_1 \cdots \underline{D}_s)\begin{pmatrix} \underline{P}_{1,1} & \cdots & \underline{P}_{1,T} \\ \vdots & \ddots & \vdots \\ \underline{P}_{S,1} & \cdots & \underline{P}_{S,T} \end{pmatrix}\begin{pmatrix} \underline{H}_{r,1} \\ \vdots \\ \underline{H}_{r,T} \end{pmatrix} \equiv \mathcal{DPH}_r$$

Thus, with the additive noise the FD expression can be written as:

$$\boxed{\mathcal{Y}_r = \mathcal{DPH}_r + N_r} \quad 1 \le r \le R, \, N_r \equiv \begin{pmatrix} N_r(k_1) \\ \vdots \\ N_r(k_K) \end{pmatrix}$$

The estimated $\mathcal{H}_r$ is given by $\hat{\mathcal{H}}_r = f(\mathcal{D}, \mathcal{P}, \mathcal{Y}_r)$ With the example techniques described below, UEs 520 may generate one or more FDIQI estimates based on the one or more signals (e.g., training signal). In some examples, UEs 520 may generate the one or more FDIQI estimates in response to a received request for the one or more FDIQI estimates. For instance, as described above, network node 502 may determine a number of FDIQI estimates that UEs 520 are to generate. In some examples, to receive the request, UEs 520 may be configured to receive the request including information indicative of a number of FDIQI estimates to generate, in response to the transmitted information indicative of the capability for generating the one or more FDIQI estimates. UEs 520 may transmit the one or more FDIQI estimates to network node 502, as illustrated in FIG. 5.

Figures 6A, 6B:
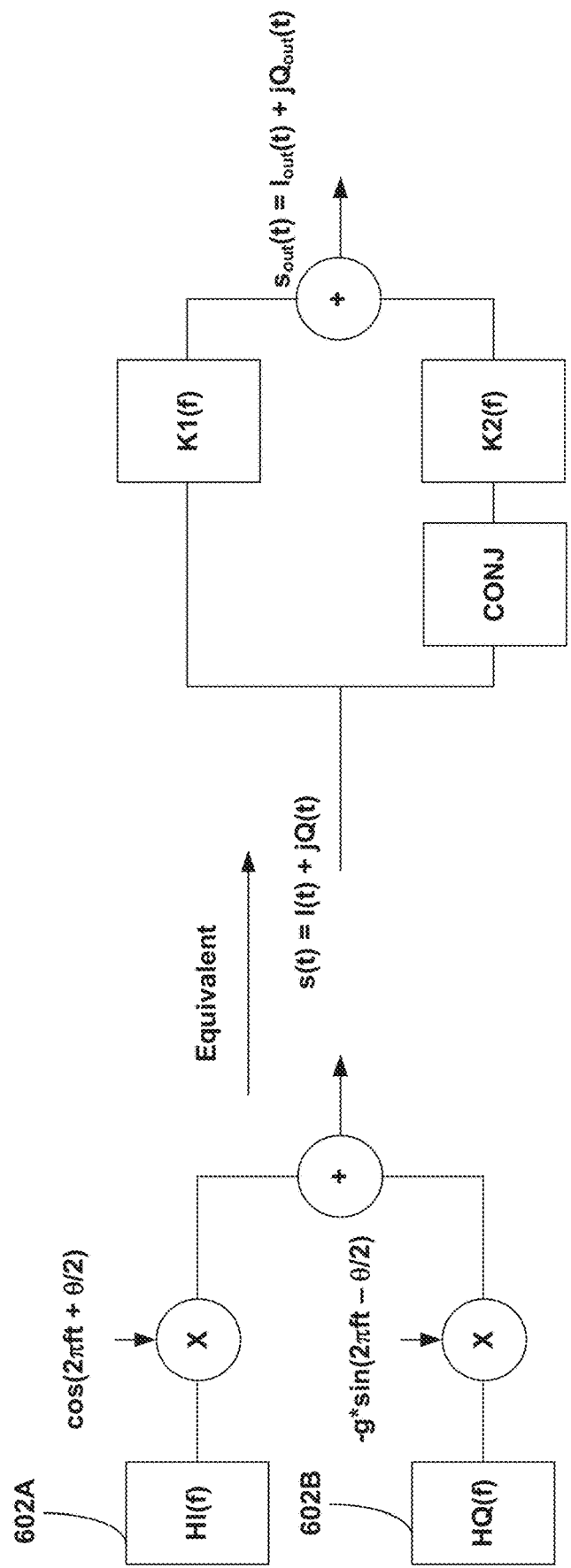
FIGS. 6A and 6B are conceptual illustrations of an IQ modulator.
Figure 7:
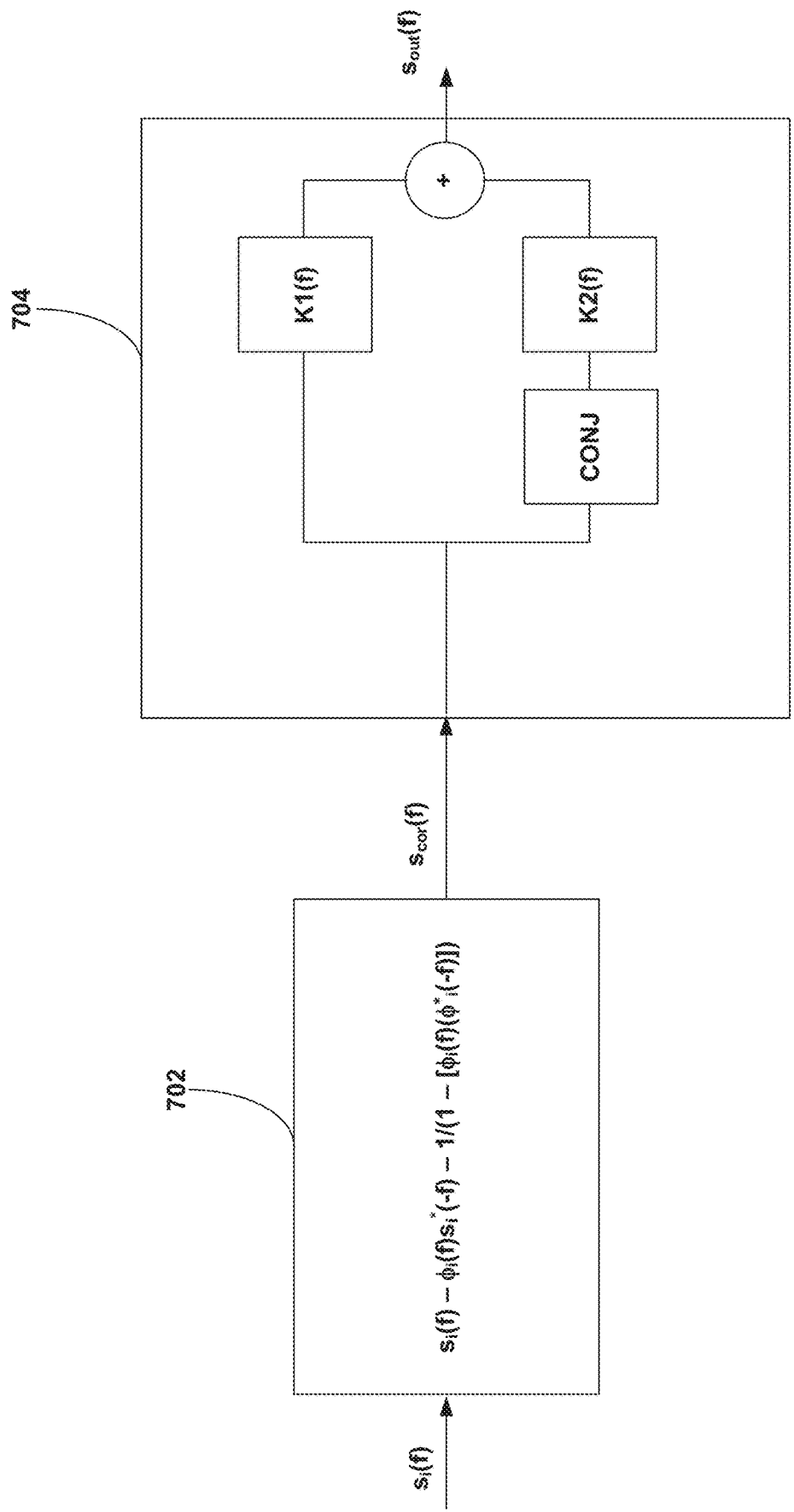
FIG. 7 is a conceptual diagram illustrating an example of a compensation filter according to some aspects of this disclosure.

Network node 502 may generate information for one or more FDIQI compensation filter coefficients based on the one or more FDIQI estimates, as also described with respect to FIGS. 6A, 6B, and 7. Network node 502 may transmit the compensation filter coefficients to RUs 504A-504C. FDIQI compensation filters 506A-506C may filter subsequent signals that come from network node 502 by applying the FDIQI compensation filter coefficients. The filtering may modify the signal such that after IQ modulation, the resulting signal is compensated of the FDIQI. That is, filters 506A-506C may apply pre-compensation that modifies the signal such that after the FDIQI is added, the resulting signal would not include the FDIQI (e.g., is compensated of FDIQI). For example, filter 506A pre-compensates for the FDIQI that IQ modulators 510A-510N add, and similar to filters 506B and 506C.

For example, the connection between network node 502 and RUs 504A-504C may be a fronthaul link that is designed to operate at low BER. Accordingly, RUs 504A-504C may receive the signal with zero noise. For instance, within RUs 504A-504C there may be no FDIQI impairment. In some examples, filters 506A-506C may apply the operation of s=>s−(FDIQI compensation filter coefficients)*conj(s), where conj refers to the complex conjugate, and s refers to the signal that network node 502 transmits to RUs 504A-504C. The FDIQI compensation filter coefficients may be different for each one of RUs 504A-504C, and/or different for each one of IQ modulators 510-510N, 512A-512N, and 514A-514N.

FIGS. 6A and 6B are conceptual illustrations of an IQ modulator. FIG. 6A illustrates an example manner in which an IQ modulated signal is generated. For instance, a first signal is input into transfer function 602A, and the output from transfer function 602A modulates an in-phase carrier signal represented by $\cos(2\pi ft + \theta/2)$ to generate an in-phase signal (I(t)). A second signal is input into transfer function 602B, and the output from the transfer function 602B modulates a quadrature carrier signal represented by $-g^*\sin(2\pi ft - \theta/2)$ to generate a quadrature signal (Q(t)). The I(t) and Q(t) signals are summed, as represented by s(t)=I(t)+jQ(t).

FIG. 6A assists in understanding the causes of the FDIQI. For example, FDIQI may be caused by imbalance in the gain (g) of the respective carrier signals, imbalance in the offset ($\theta$) of the respective carrier signals, transfer functions 602A and 602B not being equal, or skew in oscillator that creates the sin and cos waves for modulating.

FIG. 6B illustrates a conceptual equivalence to the IQ modulator of FIG. 6A, with FDIQI. For instance, $K_1(f)$ and $K_2(f)$ represent functions that emulate how FDIQI may be added on to the s signal. As one example, $s_{out}$ is equal to $s_{in}(f)K_1(f)+s^*_{in}(-f)K_2(f)$. As one example, $K_1(f)=1/2e^{j\theta/2}[HI(f)+ge^{-j\theta}HQ(f)]$, and $K_2=1/2e^{j\theta/2}[HI(f)-ge^{-j\theta}HQ(f)]$. As another example, $K_1(f)=HI(f)+ge^{-j\theta}HQ(f)$, and $K_2=HI(f)-ge^{-j\theta}HQ(f)$.

The following describes example ways in which UEs 520 may determine an FDIQI estimate using $K_1$ and $K_2$ from FIGS. 6A and 6B. For instance, the FDIQI estimate is generated with DMRS (demodulation reference signal) data (i.e., the pilot signal x), the estimated physical channel (H), and the precoder (p). UEs 520 may reproduce the signal (s) as follows: $\bar{s}(f)=P(f)\cdot\bar{x}(f)$ by using the DMRS (e.g., pilot signal x from above) and the precoder data (e.g., p from above).

UEs 520 may estimate the channel ($\tilde{H}(f)=H(f)*\text{diag}(K_1(f))$) using any channel estimation technique. In some cases, the channel estimation may suffer from IQ imbalance, and an iterative technique may be used to determine the channel estimation. By using H and s, UEs 520 may generate the FDIQI estimate (($\Phi(f)$) as follows:

$$y(f) = H(f)(s(f) \cdot *K_1(f) + s^*(-f) \cdot *K_2(f)) + w(f) =$$

$$H(f)(\text{diag}(K_1(f))s(f) + \text{diag}(K_2(f))s^*(-f)) + w(f) =$$

$$H(f)\text{diag}(K_1(f))(s(f) + \text{diag}^{-1}(K_1(f))\text{diag}(K_2(f))s^*(-f)) + w(f) =$$

$$H(f)\text{diag}(K_1(f))\left(s(f) + \text{diag}\left(\frac{K_2(f)}{K_1(f)}\right)s^*(-f)\right) + w(f) = \tilde{H}(f)$$

$$(s(f) + s^*(-f) \cdot *\Phi(f)) + w(f)\tilde{H}(f) = H(f) * \text{diag}(K_1(f)); \Phi(f) = \frac{K_2(f)}{K_1(f)}$$

Network node 502 may receive the FDIQI estimate and generate FDIQI compensation filter coefficients as follows.

$$\tilde{H}(f) = H(f) * \text{diag}(K_1(f));$$

$$\Phi(f) = \frac{K_2(f)}{K_1(f)} \rightarrow Q(f) \overset{def}{=} y(f) - \tilde{H}(f)s(f) = \tilde{H}(f)s^*(-f) \cdot *\Phi(f) + w(f) \rightarrow$$

$$Q(f) = \begin{bmatrix} \tilde{H}_{1,1}(f) & \tilde{H}_{1,2}(f) & \dots & \tilde{H}_{1,NTx}(f) \\ \tilde{H}_{2,1}(f) & \tilde{H}_{2,2}(f) & \dots & \tilde{H}_{2,NTx}(f) \\ \vdots & \vdots & \vdots & \vdots \\ \tilde{H}_{NRx,1}(f) & \tilde{H}_{NRx,1}(f) & \dots & \tilde{H}_{NRx,NTx}(f) \end{bmatrix}$$

$$\text{diag}(s_1^*(-f)s_2^*(-f) \dots s_{NTx}^*(-f))\begin{bmatrix} \Phi_1(f) \\ \Phi_2(f) \\ \vdots \\ \Phi_{NTx}(f) \end{bmatrix} + w(f) \overset{def}{=}$$

$$U(f) \cdot \Phi(f) + w(f)\hat{\Phi}_{LS}(f) = \left[U(f)^H U(f)\right]^{-1} U(f)^H Q(f)\hat{\Phi}_{LMMSE}(f) =$$

$$\left[U(f)^H U(f) + \sigma_w^2 \cdot I\right]^{-1} U(f)^H Q(f)$$

In the above example, $\hat{\Phi}(f)$ is an example of the FDIQI compensation filter coefficient. Network node 502 may transmit $\hat{\Phi}(f)$ to RUs 504A-504C for implementing FDIQI compensation filters 506A-506C.

FIG. 7 is a conceptual diagram illustrating an example of a compensation filter according to some aspects of this disclosure. For instance, FIG. 7 illustrates a conceptual diagram of FDIQI compensation filter 702, which is an example of filters 506A-506C. For instance, FDIQI compensation filter 702 may receive all $\hat{\Phi}(f)$ from network node 502. FDIQI compensation filter 702 may apply the following equation: $s_i(f) - \hat{\Phi}_i(f)s_i^*(-f) - 1/(1 - \hat{\Phi}_i(f)(\hat{\Phi}^*_i(-f)])$. The result may be a pre-compensated signal ($s_{cor}(f)$) that is output to IQ modulator 704, which is a conceptual illustration of IQ modulators 508A-508N, 510A-510N, and 512A-512N, that includes FDIQI. Because $s_{cor}(f)$ is pre-compensated to correct for the FDIQI when the FDIQI is added, the output from IQ modulator 704 may be the original signal s that network node 502 outputted.

Figure 8:
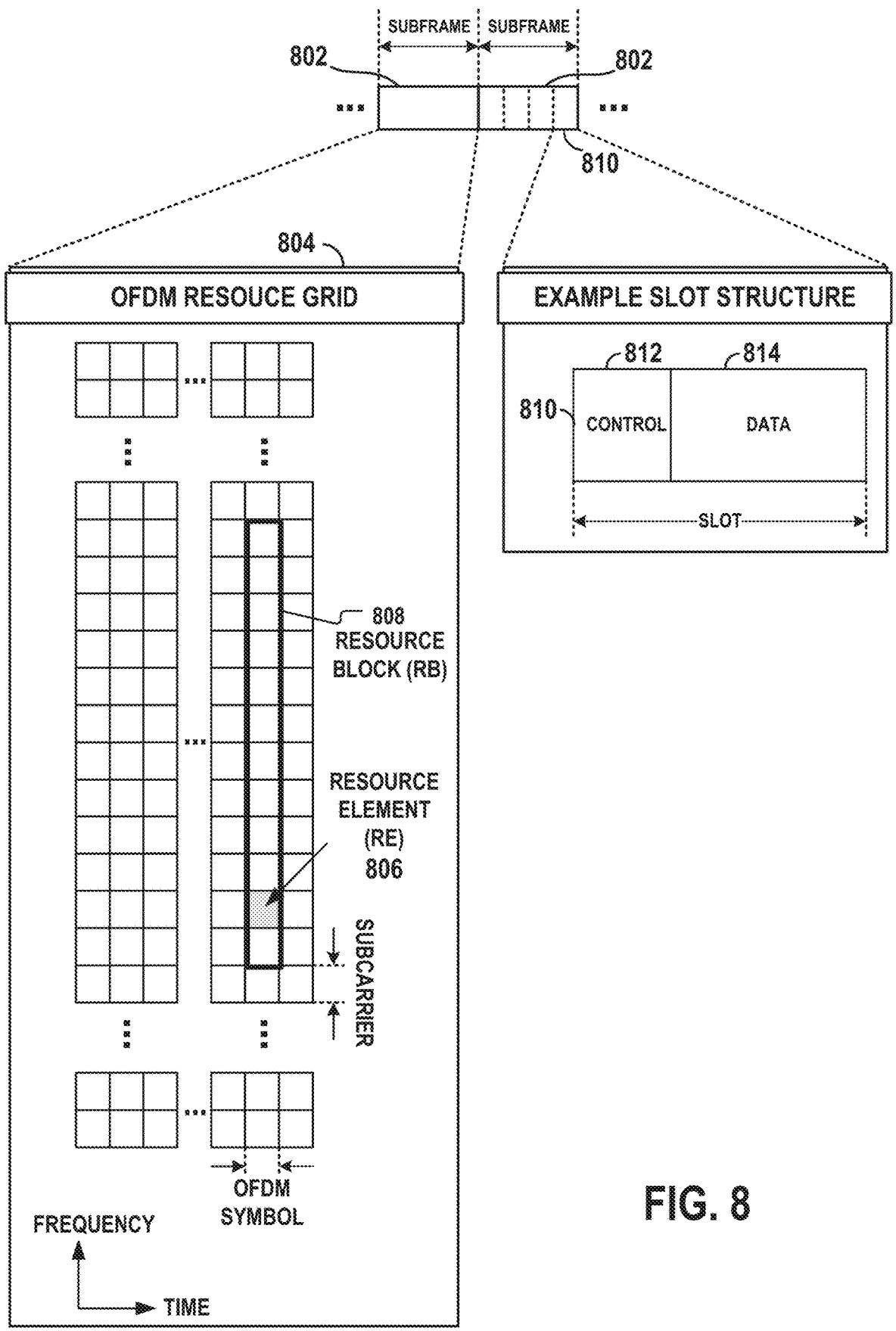
FIG. 8 is a schematic illustration of an OFDM air interface utilizing a scalable numerology according to some aspects of this disclosure.

FIG. 8 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may include a set of subframes (e.g., 10 subframes of 1 ms each). A given carrier may include one set of frames in the UL, and another set of frames in the DL.

FIG. 8 illustrates an expanded view of an exemplary DL subframe 802, showing an OFDM resource grid 804. However, as those skilled in the art will readily appreciate, the PHY transmission structure for any application may vary from the example described here, depending on any number of factors. Here, time is in the horizontal direction with units of OFDM symbols; and frequency is in the vertical direction with units of subcarriers or tones.

The resource grid 804 may schematically represent time-frequency resources for a given antenna port. That is, in a MIMO implementation with multiple antenna ports available, a corresponding multiple number of resource grids 804 may be available for communication. The resource grid 804 is divided into multiple resource elements (REs) 806. An RE, which is 1 subcarrier×1 symbol, is the smallest discrete part of the time—frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 808, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of the resource grid 804. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 808 occupies less than the entire bandwidth of the subframe 802, with some subcarriers illustrated above and below the RB 808. In a given implementation, subframe 802 may have a bandwidth corresponding to any number of one or more RBs 808. Further, the RB 808 is shown occupying less than the entire duration of the subframe 802, although this is merely one possible example.

Each 1 ms subframe 802 may include one or multiple adjacent slots. In FIG. 8, one subframe 802 includes four slots 810, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of the slots 810 illustrates the slot 810 including a control region 812 and a data region 814. In general, the control region 812 may carry control channels (e.g., PDCCH), and the data region 814 may carry data channels (e.g., PDSCH or PUSCH). Of course, a slot may contain all DL, all UL, or at least one DL portion and at least one UL portion. The structure illustrated in FIG. 8 is merely exemplary in nature, and different slot structures may be utilized, and may include one or more of each of the control region(s) and data region(s).

Although not illustrated in FIG. 8, the various REs 806 within an RB 808 may carry one or more physical channels, including control channels, shared channels, data channels, etc. Other REs 806 within the RB 808 may also carry pilots or reference signals. These pilots or reference signals may provide for a receiving device to perform channel estimation of the corresponding channel, which may enable coherent demodulation/detection of the control and/or data channels within the RB 808.

In a DL transmission, the transmitting device (e.g., a network node 108) may allocate one or more REs 806 (e.g., within a control region 812) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 806 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node 108 to schedule uplink transmissions. Here, in response to the SR transmitted on the UL control channel 118 (e.g., a PUCCH), the network node 108 may transmit downlink control information (DCI) 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 806 (e.g., within the data region 814) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB 1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 8 are not necessarily all the channels or carriers that may be utilized between a network node 108 and UE 106, and those of ordinary skill in the art will recognize that other channels or carriers may be utilized in addition to those illustrated, such as other traffic, control, and feedback channels.

Figure 9:
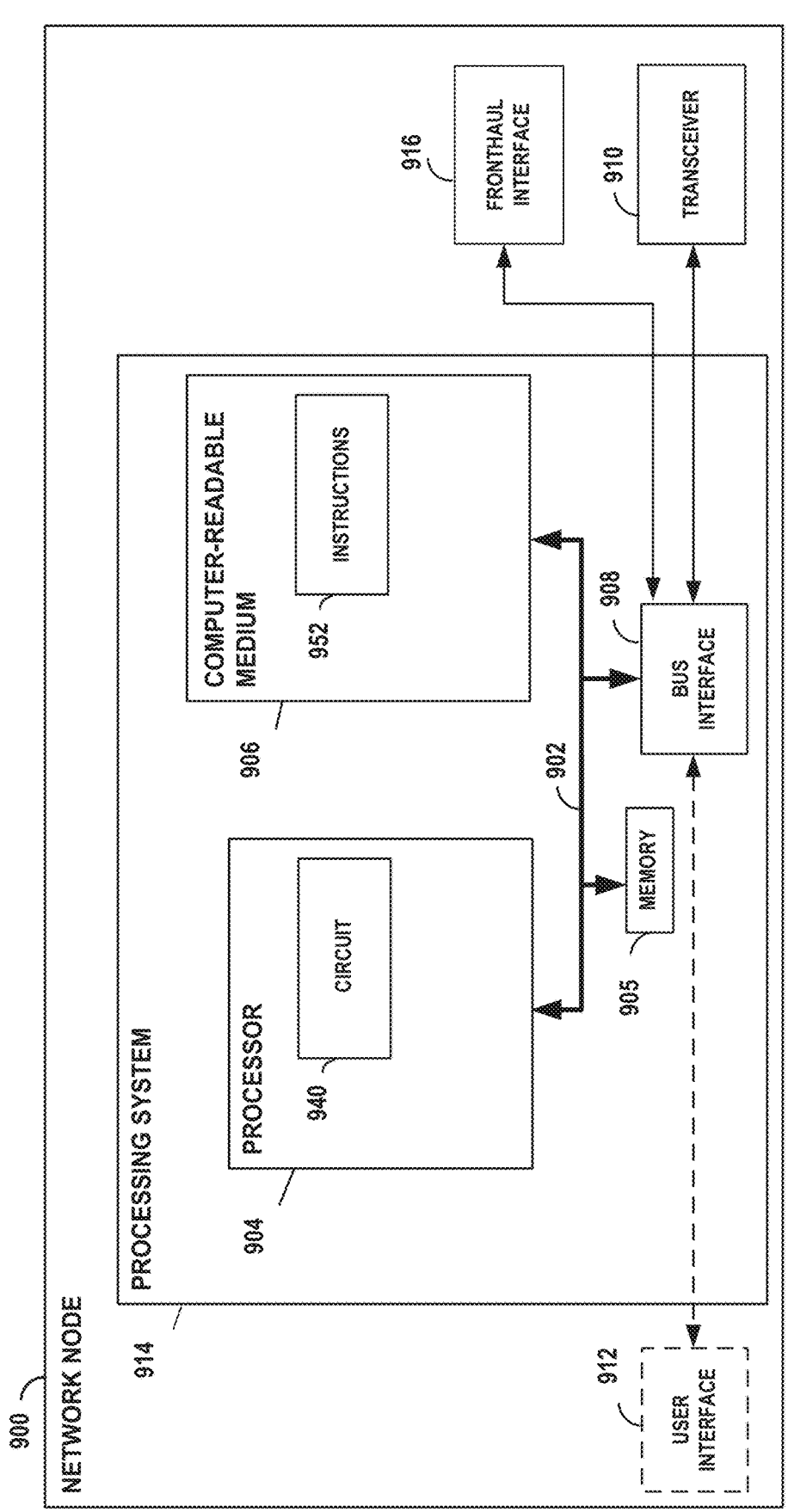
FIG. 9 is a block diagram conceptually illustrating an example of a hardware implementation for a network node according to some aspects of this disclosure.

FIG. 9 is a block diagram illustrating an example of a hardware implementation for a network node 900 employing a processing system 914. In one example, the network node 900 may be one or more DUs 330, one or more CUs 310, a combination of one or more DUs 330 and one or more CUs 310, another component of a gNb, or any combination thereof.

The network node 900 may include a processing system 914 having one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 900 may be configured to perform any one or more of the functions described herein. For example, the processor 904, as utilized in a network node 900, may be configured (e.g., in coordination with the memory 905) to implement any one or more of the processes and procedures described below and illustrated in FIGS. 12 and 14. The processor 904, as utilized in a network node 900 as an example of RUs 340 or RUs 504A-504C, may be configured (e.g., in coordination with the memory 905) to implement any one or more of the processes and procedures described below and illustrated in FIGS. 12 and 14.

The processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and some examples, such as a base station, may omit it.

As illustrated in FIG. 9, network node 900 includes fronthaul interface 916 coupled to bus interface 908. In some examples, fronthaul interface 916 may couple to the fronthaul link (e.g., fiber optic link, or other fronthaul link) for communicating with one or more RUs. Transceiver 910 may be configured for wireless communication.

In some aspects of the disclosure, the processor 904 may include circuitry 940 configured (e.g., in coordination with the memory 905) for various functions, including, causing transmission of one or more signals for frequency dependent in-phase quadrature imbalance (FDIQI) estimation to one or more user equipments (UEs), receiving one or more FDIQI estimates from the one or more UEs for one or more radio units (RUs), generating information for one or more FDIQI compensation filter coefficients based on the one or more FDIQI estimates, and transmitting the information for the one or more FDIQI compensation filter coefficients to the one or more RUs that are in communication with the one or more UEs. In general, circuitry 940 may be configured to perform the example techniques described with respect to FIGS. 12 and 14.

The processor 904 is responsible for managing the bus 902 and general processing, including the execution of software stored on the computer-readable medium 906. The software, when executed by the processor 904, causes the processing system 914 to perform the various functions described below for any particular apparatus. The processor 904 may also use the computer-readable medium 906 and the memory 905 for storing data that the processor 904 manipulates when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may store computer-executable code that includes instructions 952 that configure a network node 900 for various functions, including, causing transmission of one or more signals for frequency dependent in-phase quadrature imbalance (FDIQI) estimation to one or more user equipments (UEs), receiving one or more FDIQI estimates from the one or more UEs for one or more radio units (RUs), generating information for one or more FDIQI compensation filter coefficients based on the one or more FDIQI estimates, and transmitting the information for the one or more FDIQI compensation filter coefficients to the one or more RUs that are in communication with the one or more UEs. In general, instruction 952 may configure a network node 900 to perform the example techniques described with respect to FIGS. 12 and 14.

Figure 12:
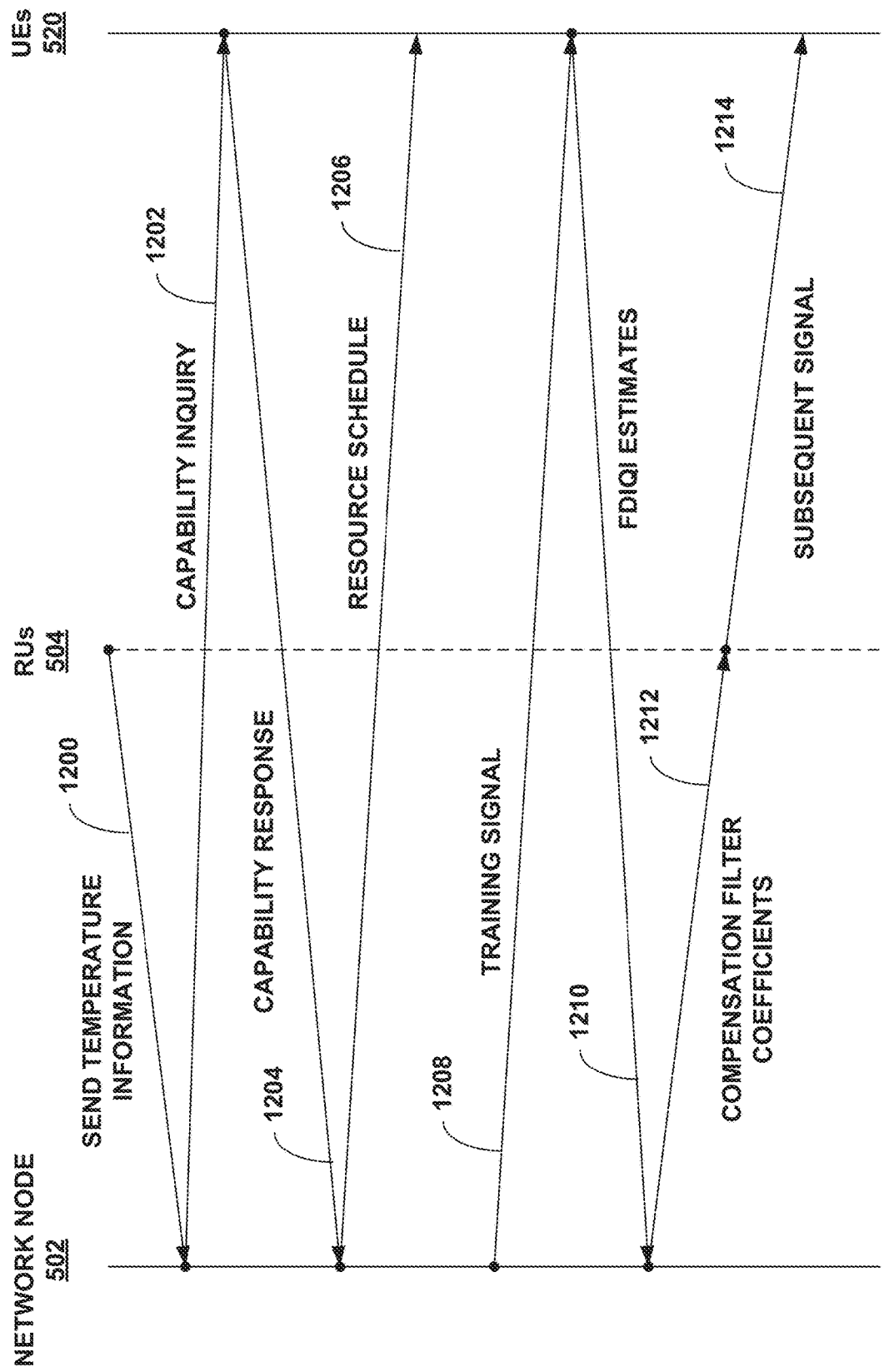
FIG. 12 is a flow diagram illustrating an example of communication between a network node, one or more RUs, and one or more UEs.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 3, and/or 5, and utilizing, for example, the processes and/or algorithms described herein in relation to FIGS. 12 and/or 14.

Figure 10:
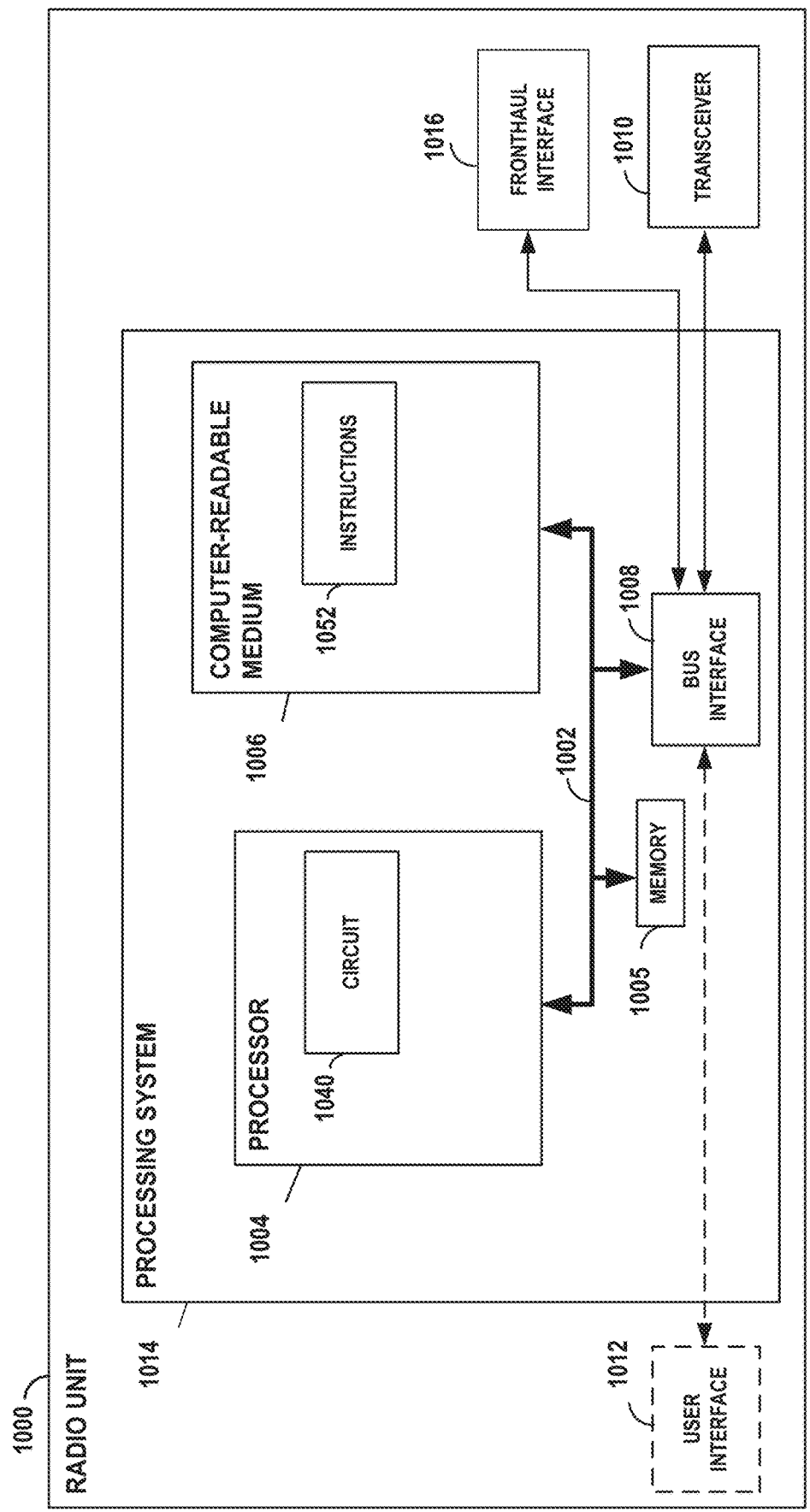
FIG. 10 is a block diagram conceptually illustrating an example of a hardware implementation for a radio unit (RU) according to some aspects of this disclosure.

FIG. 10 is a block diagram conceptually illustrating an example of a hardware implementation for a radio unit (RU) 1000 employing a processing system 1014. Examples of RU 1000 include one or more RUs 340 and 504. In accordance with various aspects of the disclosure, a processing system 1014 may include an element, or any portion of an element, or any combination of elements having one or more processors 1004.

The processing system 1014 may be substantially the same as the processing system 914 illustrated in FIG. 9, including a bus interface 1008, a bus 1002, memory 1005, a processor 1004, and a computer-readable medium 1006. Furthermore, the RU 1000 may include a user interface 1012, a transceiver 1010, a fronthaul interface 1016, substantially similar to those described above in FIG. 9. That is, the processor 1004, as utilized in a RU 1000, may be configured (e.g., in coordination with the memory 1005) to implement any one or more of the processes described below and illustrated in FIGS. 12 and 15.

In some aspects of the disclosure, the processor 1004 may include circuitry 1040 configured (e.g., in coordination with the memory 1005) for various functions, including, for example, receiving, from a network node (e.g., network node 900), information for coefficients for one or more frequency dependent in-phase-quadrature imbalance (FDIQI) compensation filters, and communicating with a user equipment (UE) utilizing a link that is compensated by the one or more FDIQI compensation filters. In general, circuitry 1040 may be configured to perform the example techniques described with respect to FIGS. 12 and 15.

And further, the computer-readable storage medium 1006 may store computer-executable code that includes instructions 1052 that configure a RU 1000 for various functions, including, receiving, from a network node (e.g., network node 900), information for coefficients for one or more frequency dependent in-phase-quadrature imbalance (FDIQI) compensation filters, and communicating with a user equipment (UE) utilizing a link that is compensated by the one or more FDIQI compensation filters. In general, instruction 1052 may configure a RU 1000 to perform the example techniques described with respect to FIGS. 12 and 15.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 3 and/or 5, and utilizing, for example, the processes and/or algorithms described herein in relation to FIGS. 12 and/or 15.

Figure 11:
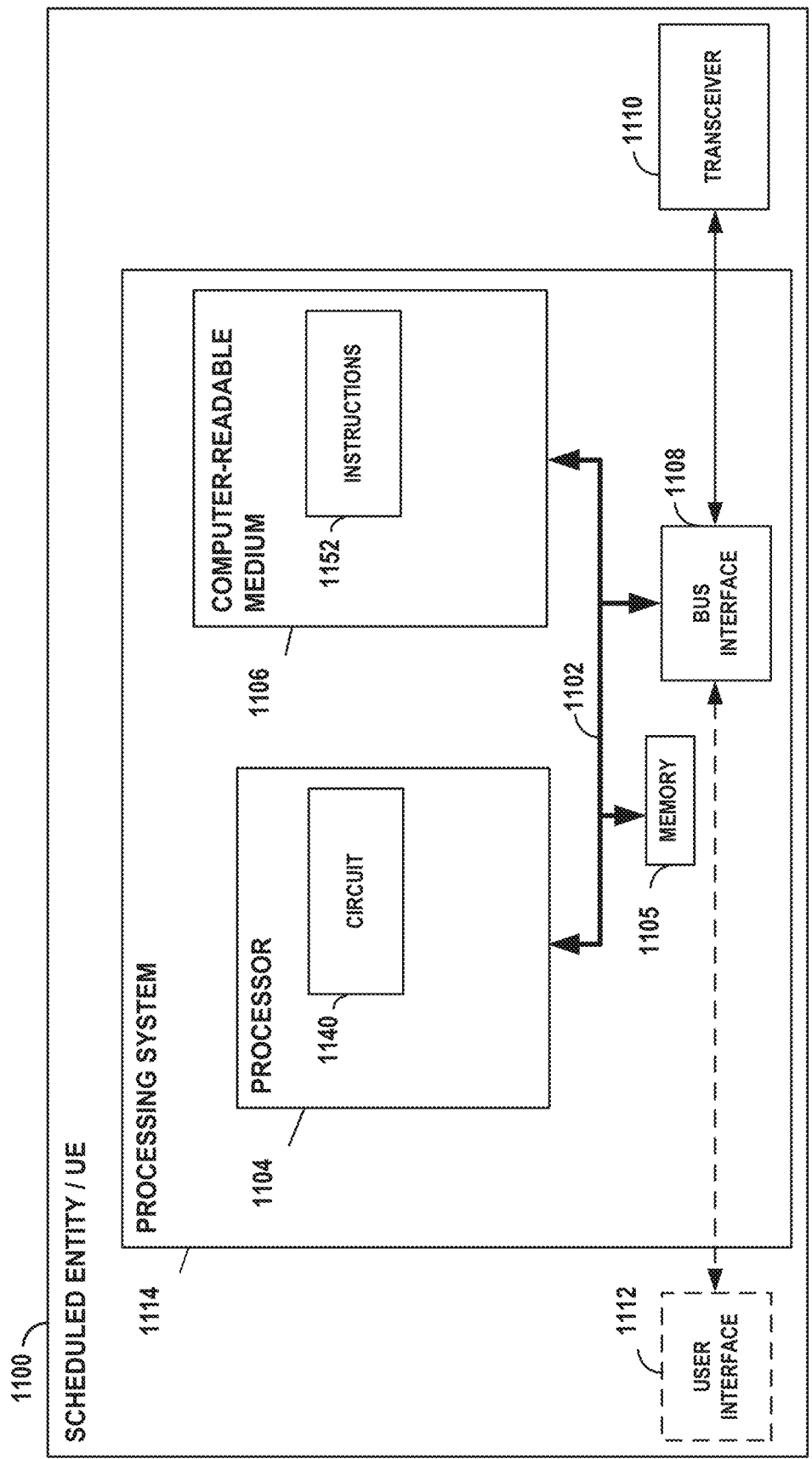
FIG. 11 is a block diagram conceptually illustrating an example of a hardware implementation for a user equipment (UE) according to some aspects of this disclosure.

FIG. 11 is a conceptual diagram illustrating an example of a hardware implementation for an exemplary scheduled entity 1100 (e.g., UE 1100) employing a processing system 1114. Scheduled entity 1100 is an example UEs 106 and 520. In accordance with various aspects of the disclosure, a processing system 1114 may include an element, or any portion of an element, or any combination of elements having one or more processors 1104. For example, the scheduled entity 1100 may be a user equipment (UE) as illustrated in any one or more of FIGS. 1, 2, 3, and/or 5.

The processing system 1114 may be substantially the same as the processing system 914 illustrated in FIG. 9, including a bus interface 1108, a bus 1102, memory 1105, a processor 1104, and a computer-readable medium 1106. Furthermore, the UE 1100 may include a user interface 1112 and a transceiver 1110 substantially similar to those described above in FIG. 9. That is, the processor 1104, as utilized in a UE 1100, may be configured (e.g., in coordination with the memory 1105) to implement any one or more of the processes described below and illustrated in FIGS. 12 and 13.

In some aspects of the disclosure, the processor 1104 may include circuitry 1140 configured (e.g., in coordination with the memory 1105) for various functions, including, for example, receiving one or more signals for determining frequency dependent in-phase quadrature imbalance (FDIQI) estimates, generating one or more FDIQI estimates based on the one or more signals, and transmitting the one or more FDIQI estimates to a network node. In general, circuitry 1140 may be configured to perform the example techniques described with respect to FIGS. 12 and 13.

And further, the computer-readable storage medium 1106 may store computer-executable code that includes instructions 1152 that configure a UE 1100 for various functions, including, receiving one or more signals for determining frequency dependent in-phase quadrature imbalance (FDIQI) estimates, generating one or more FDIQI estimates based on the one or more signals, and transmitting the one or more FDIQI estimates to a network node. In general, instruction 1152 may configure a UE 1100 to perform the example techniques described with respect to FIGS. 12 and 13.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 3 and/or 5, and utilizing, for example, the processes and/or algorithms described herein in relation to FIGS. 12 and/or 13.

FIG. 12 is a flow diagram illustrating an example of communication between a network node, one or more RUs, and one or more UEs. The example of FIG. 12 is described with respect to components illustrated in FIG. 5 for ease.

In FIG. 12, one or more RUs 504 may send a temperature indication to network node 502, which might be sent rarely (1200). In some cases, network node 502 may determine whether a threshold amount of time has elapsed since FDIQI compensation filter coefficients were updated. Based on the temperature indication (e.g., if there is a threshold change in temperature), network node 502 may determine that FDIQI compensation filter coefficients should be refreshed. For example, RUs 504 may transmit temperature information to network node 502 that causes a refresh of the coefficients for the one or more FDIQI compensation filters. As another example, based on if the threshold amount of time has passed, network node 502 may determine that FDIQI compensation filter coefficients should be refreshed.

For FDIQI compensation filter coefficients refresh, network node 502 may cause transmission of respective capability inquiries to the one or more UEs 520 inquiring capability of the one or more UEs 520 to generate the FDIQI estimates (1202). UEs 520 may receive a capability inquiry for generating the one or more FDIQI estimates, determine capability for generating the one or more FDIQI estimates, and transmit information indicative of the capability for generating the one or more FDIQI estimates (1204). As one example, the information indicative of the capability for generating the one or more FDIQI estimates may include information indicative of a maximum number of FDIQI estimates UEs 520 are configured to generate.

Network node 502 may cause transmission of a resource schedule for when UEs 520 are to generate and transmit respective FDIQI estimates (1206). As one example, UEs 520 may receive a request for the one or more FDIQI estimates. For instance, UEs 520 may receive the request including information indicative of a number of FDIQI estimates to generate, in response to the transmitted information indicative of the capability for generating the one or more FDIQI estimates. In one or more examples, UEs 520 may generate the one or more FDIQI estimates in response to the request for the one or more FDIQI estimates, such as during the resource schedule.

Network node 502 may cause transmission of one or more signals (e.g., training signals) for FDIQI estimation to one or more UEs 520 (1208). UEs 520 may receive one or more signals (e.g., training signals) for determining FDIQI estimates (1208). UEs 520 may generate one or more FDIQI estimates based on the one or more signals (e.g., training signals). UEs 520 may transmit the one or more FDIQI estimates to network node 502 (1210).

As described above, how many FDIQI estimates and for which RUs 504 each one of UEs 502 generate may be determined by network node 502. As one example, a first UE may be in communication with a first RU. To receive the one or more signals, the first UE may be configured to receive a first signal from a first IQ modulator of the first RU and receive a second signal from a second IQ modulator of the first RU. In this example, to generate the one or more FDIQI estimates, the first UE may be configured to generate a first FDIQI estimate for the first IQ modulator based on the first signal and generate a second FDIQI estimate for the second IQ modulator based on the second signal.

As another example, a second UE may be in communication with a second RU. To receive the one or more signals, the second UE may be configured to receive a signal from a first IQ modulator of the second RU. To generate the one or more FDIQI estimates, the second UE may be configured to generate an FDIQI estimate for the first IQ modulator based on the signal and avoid generating an FDIQI estimate for a second IQ modulator of the second RU. That is, network node 502 may have determined that the second UE should generate a FDIQI estimate for the first IQ modulator, and not for the second IQ modulator for the second RU.

Network node 502 may determine the compensation filter coefficients, and transmit the compensation filter coefficients to RUs 504 (1212). The subsequent signals that RUs 504 transmit may be generated based on the FDIQI estimate (e.g., where the FDIQI compensation filter coefficients are based on the FDIQI estimate) (1214). For instance, RUs 504 may receive, from network node 502, information for coefficients for one or more FDIQI compensation filters, and communicate with a UE 520 utilizing a link that is compensated by the one or more FDIQI compensation filters. For example, RUs 504 may include at least one antenna, and at least one IQ modulator coupled to the at least one antenna. To communicate with the UE 504 utilizing the link, RUs 504 may be configured to apply the one or more FDIQI compensation filters to a signal that is modulated by the at least one IQ modulator and transmitted by the at least one antenna.

Figure 13:
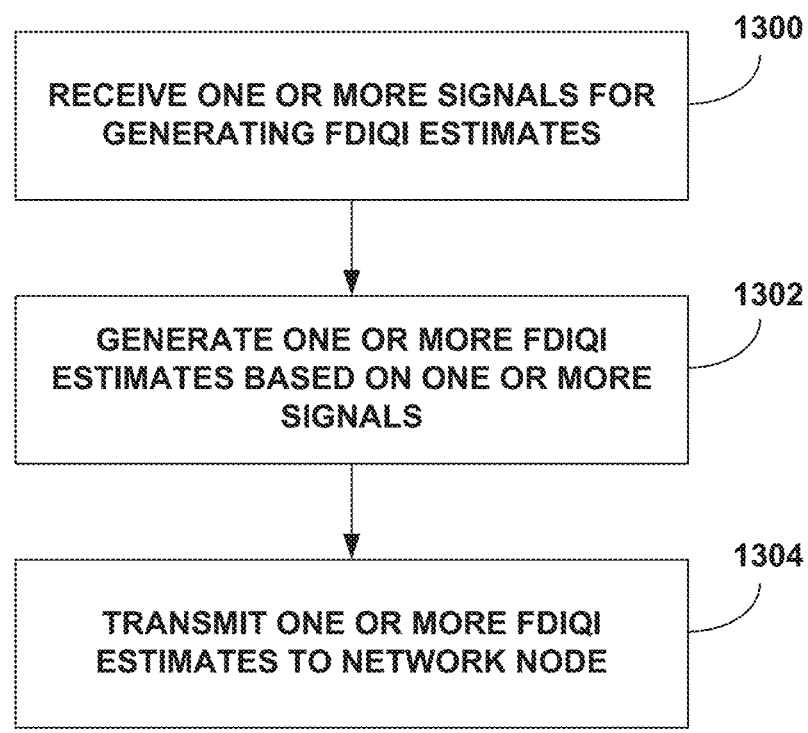
FIG. 13 is a flow chart illustrating an example of a process for generating imbalance estimates according to some aspects of this disclosure.

FIG. 13 is a flow chart illustrating an exemplary process for generating imbalance estimates in accordance with some aspects of the present disclosure. As described below, a particular implementation may omit some or all illustrated features, and may not require some illustrated features to implement all embodiments. In some examples, the UE 1000 illustrated in FIG. 12 may be configured to carry out the example of FIG. 13. In some examples, any suitable apparatus or means for carrying out the functions or algorithm described below may carry out the example of FIG. 13.

UE 1000 may be configured to receive one or more signals (e.g., training signals) for generating FDIQI estimates (1300). For instance, transceiver 1110 may be configured to receive one or more signals that network node 900 generates. Processor 1104 coupled to transceiver 11100 via bus 1102 may receive the one or more signals from transceiver 1110.

In some examples, prior to receiving the training signals, transceiver 1100 and processor 1104 may receive a capability inquiry for generating the one or more FDIQI estimates, determine capability for generating the one or more FDIQI estimates, and transmit information indicative of the capability for generating the one or more FDIQI estimates. The information indicative of the capability for generating the one or more FDIQI estimates may include information indicative of a maximum number of FDIQI estimates that processor 1104 may be configured to generate.

As one example, processor 1104 may perform the following operations to determine the maximum number of FDIQI estimates that processor 1104 may be configured to generate:

$$N\_fdrsb\_capability < (n_{rx})(n_{trainingsymbols})(FD\_resolution\_gNb),$$

where N_fdrsb_capability is the maximum number of FDIQI estimates that a particular UE 106 can generate, $n_{rx}$ is the number of receive antennas for the particular UE 106, $n_{trainingsymbols}$ is the number of training symbols used for FDIQI estimation, and FD_resolution_gNb is a desired resolution determined by the network nodes.

UE 1000 may be configured to generate one or more FDIQI estimates based on the one or more signals (e.g., training signals) (1302). For example, processor 1104 may be configured to determine ($\Phi(f)$) as described above, as an example technique to generate one or more FDIQI estimates.

Processor 1104 (e.g., via transceiver 1110) may receive a request for the one or more FDIQI estimates (e.g., from network node 900). To generate the one or more FDIQI estimates, processor 1104 may be configured to generate the one or more FDIQI estimates in response to the request for the one or more FDIQI estimates. For example, processor 1104 may be configured to receive the request including information indicative of a number of FDIQI estimates to generate, and in response may generate the requested number of FDIQI estimates. In some examples, processor 1104 may receive information indicative of a resource on which processor 1104 is to transmit the one or more FDIQI estimates.

For example, processor 1104 may be in communication with a RU 1000. In one example, to receive the one or more signals, processor 1104 may be configured to receive a first signal from a first IQ modulator of the RU 1000 and receive a second signal from a second IQ modulator of the RU 1000. To generate the one or more FDIQI estimates, processor 1104 may be configured to generate a first FDIQI estimate for the first IQ modulator based on the first signal and generate a second FDIQI estimate for the second IQ modulator based on the second signal. In another example, to receive the one or more signals, processor 1104 may be configured to receive a signal from a first IQ modulator of the RU 1000. To generate the one or more FDIQI estimates, processor 1104 may be configured to generate an FDIQI estimate for the first IQ modulator based on the signal and avoid generating an FDIQI estimate for a second IQ modulator of the RU 1000. For instance, network node 502 may have determined that processor 1104 is to generate the FDIQI for only one of the IQ modulators in this example.

Processor 1104 (e.g., via transceiver 1110) may transmit the one or more FDIQI estimates to network node 900 (1304). Processor 1104 may then receive a subsequent signal generated based on the FDIQI estimates (e.g., filtered by FDIQI compensation filter coefficients determined from the FDIQI estimates).

Figure 14:
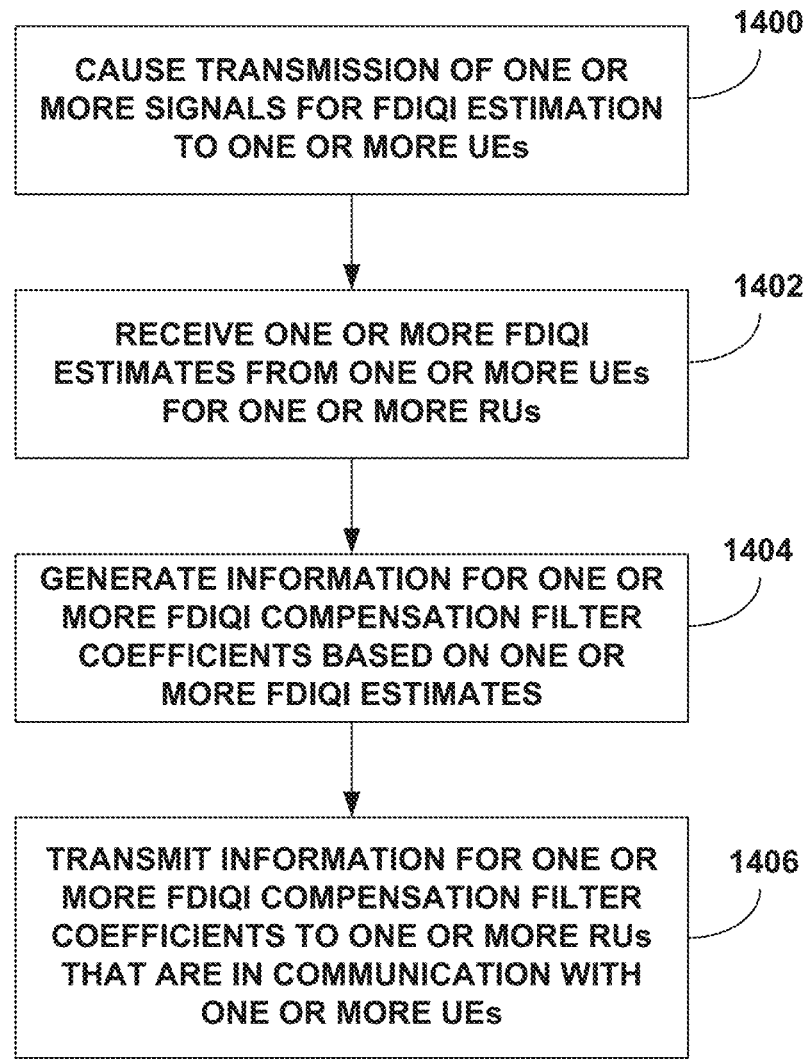
FIG. 14 is a flow chart illustrating an example of a process for generating compensation filter coefficients according to some aspects of this disclosure.

FIG. 14 is a flow chart illustrating an exemplary process for generating compensation filter coefficients in accordance with some aspects of the present disclosure. As described below, a particular implementation may omit some or all illustrated features, and may not require some illustrated features to implement all embodiments. In some examples, the network node 900 (e.g., functioning as network node 502) illustrated in FIG. 9 may be configured to carry out the example of FIG. 14. In some examples, any suitable apparatus or means for carrying out the functions or algorithm described below may carry out the example of FIG. 14.

Processor 904 may cause transmission of one or more signals (e.g., training signals) for FDIQI estimation to one or more UEs 1100 (1400). For example, processor 904 may cause fronthaul interface 916 to transmit the training signals to RU 1000, and other RUs, which then transmit the signals to UEs 1100.

In some examples, prior to transmitting the training signals, processor 904 may receive respective capability information of the one or more UEs to generate FDIQI estimates. For example, processor 904 may cause transmission of respective capability inquiries to the one or more UEs 1100 inquiring capability of the one or more UEs 1100 to generate the FDIQI estimates. To receive the respective capability information, processor 904 may be configured to receive the respective capability information in response to the transmission of the respective capability inquiries.

Processor 904 may receive one or more FDIQI estimates from the one or more UEs 1100 for RUs 1000 (1402). Processor 904 may be configured to determine scheduling of resources for the UEs 1100 to determine the one or more FDIQI estimates that network node 900 is to receive. In some examples, processor 904 may determine a number of FDIQI estimates that each UE of one or more UEs 1000 is to transmit based on capability information of the one or more UEs 1000 to generate FDIQI estimates, and cause transmission of the determined number to the one or more UEs 1000. In such examples, to receive one or more FDIQI estimates from the UEs 1000, network node 900 may be configured to receive the one or more FDIQI estimates from the one or more UEs 1000 based on the respective determined number of FDIQI estimates that each UE is to transmit.

As one example, the one or more FDIQI estimates include a first FDIQI estimate for a first IQ modulator of a RU of the one or more RUs 1000 generated by a UE of the one or more UEs 1000, and a second FDIQI estimate for a second IQ modulator of the same RU generated by the same UE. As another example, the one or more FDIQI estimates include a first FDIQI estimate for a first IQ modulator of a RU of the one or more RUs 1000 generated by a first UE of the one or more UEs 900 in communication with the RU, and a second FDIQI estimate for a second IQ modulator of the RU generated by a second UE of the one or more UEs 900 in communication with the RU. That is, two different UEs may together determine the FDIQI estimate for the IQ modulators of the same RU.

Processor 904 may generate information for one or more FDIQI compensation filter coefficients based on the one or more FDIQI estimates (1404). For example, processor 904 may determine $\hat{\Phi}(f)$ using the example techniques described above. Processor 904 may transmit the information for the one or more FDIQI compensation filter coefficients to the one or more RUs 1000 that are in communication with the one or more UEs 1100 (1406).

Figure 15:
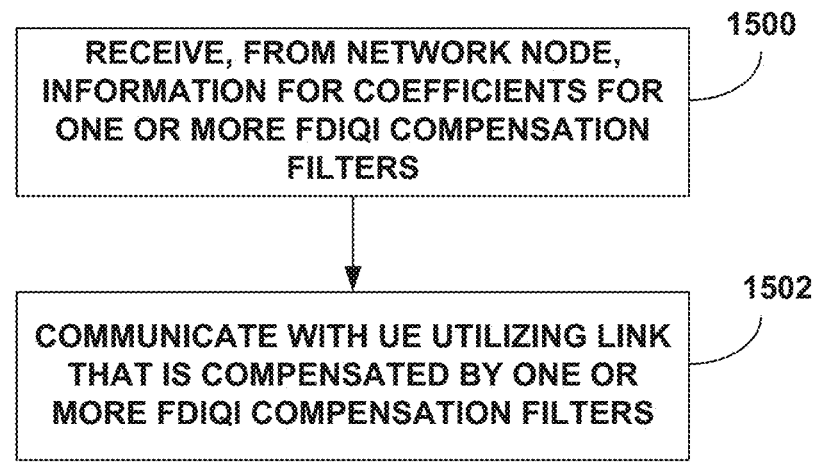
FIG. 15 is a flow chart illustrating an example of a process for communicating between an RU and one or more UEs with a compensated link according to some aspects of this disclosure.

FIG. 15 is a flow chart illustrating an exemplary process for communicating between an RU and one or more UEs with a compensated link in accordance with some aspects of the present disclosure. As described below, a particular implementation may omit some or all illustrated features, and may not require some illustrated features to implement all embodiments. In some examples, the radio unit (RU) 1000 illustrated in FIG. 10 may be configured to carry out the example of FIG. 15. In some examples, any suitable apparatus or means for carrying out the functions or algorithm described below may carry out the example of FIG. 15.

Processor 1004 may receive, from network node 900, information for coefficients for one or more FDIQI compensation filters (1500). As one example, fronthaul interface 1016 may receive information for coefficients for one or more FDIQI compensation filters from network node 900. For example, processor 1004 may receive $\hat{\Phi}(f)$ as determined by network node 900.

Processor 1004 may communicate with a UE utilizing a link that is compensated by the one or more FDIQI compensation filters (1502). For example, processor 1004 may perform filtering using the transfer function 702 illustrated in FIG. 7, and applying the resulting signal to an IQ modulator, like IQ modulator 704 in FIG. 7.

The various example techniques described in this disclosure may be implemented separately or together. The following describes some example techniques that may be implemented separately or together.

Clause 1: An apparatus for wireless communication, comprising: a memory; and a processor coupled to the memory and configured to: receive one or more signals for determining frequency dependent in-phase quadrature imbalance (FDIQI) estimates; generate one or more FDIQI estimates based on the one or more signals; and transmit the one or more FDIQI estimates to a network node.

Clause 2. The apparatus of clause 1, wherein the processor is configured to receive a subsequent signal generated based on the FDIQI estimates.

Clause 3. The apparatus of any of clauses 1 and 2, wherein the processor is in communication with a radio unit (RU), wherein to receive the one or more signals, the processor is configured to receive a first signal from a first IQ modulator of the RU and receive a second signal from a second IQ modulator of the RU, and wherein to generate the one or more FDIQI estimates, the processor is configured to generate a first FDIQI estimate for the first IQ modulator based on the first signal and generate a second FDIQI estimate for the second IQ modulator based on the second signal.

Clause 4. The apparatus of any of clauses 1-3, wherein the processor is in communication with a radio unit (RU), wherein to receive the one or more signals, the processor is configured to receive a signal from a first IQ modulator of the RU, and wherein to generate the one or more FDIQI estimates, the processor is configured to generate an FDIQI estimate for the first IQ modulator based on the signal and avoid generating an FDIQI estimate for a second IQ modulator of the RU.

Clause 5. The apparatus of any of clauses 1-4, wherein the processor is configured to: receive a request for the one or more FDIQI estimates, wherein to generate the one or more FDIQI estimates, the processor is configured to generate the one or more FDIQI estimates in response to the request for the one or more FDIQI estimates.

Clause 6. The apparatus of clause 5, wherein the processor is configured to: receive a capability inquiry for generating the one or more FDIQI estimates; determine capability for generating the one or more FDIQI estimates; and transmit information indicative of the capability for generating the one or more FDIQI estimates, wherein to receive the request, the processor is configured to receive the request including information indicative of a number of FDIQI estimates to generate.

Clause 7. The apparatus of clause 6, wherein the information indicative of the capability for generating the one or more FDIQI estimates comprises information indicative of a maximum number of FDIQI estimates the processor is configured to generate.

Clause 8. The apparatus of any of clauses 1-7, wherein the processor is configured to receive information indicative of a resource on which the processor is to transmit the one or more FDIQI estimates.

Clause 9. The apparatus of any of clauses 1-8, wherein the one or more signals for generating FDIQI estimates comprise one or more training signals for generating FDIQI estimates.

Clause 10. An apparatus for wireless communication, comprising: a memory; and a processor coupled to the memory and configured to: cause transmission of one or more signals for frequency dependent in-phase quadrature imbalance (FDIQI) estimation to one or more user equipments (UEs); receive one or more FDIQI estimates from the one or more UEs for one or more radio units (RUs); generate information for one or more FDIQI compensation filter coefficients based on the one or more FDIQI estimates; and transmit the information for the one or more FDIQI compensation filter coefficients to the one or more RUs that are in communication with the one or more UEs.

Clause 11. The apparatus of clause 10, wherein the processor is configured to receive respective capability information of the one or more UEs to generate FDIQI estimates.

Clause 12. The apparatus of clause 11, wherein the processor is configured to cause transmission of respective capability inquiries to the one or more UEs inquiring capability of the one or more UEs to generate the FDIQI estimates, and wherein to receive the respective capability information, the processor is configured to receive the respective capability information in response to the transmission of the respective capability inquiries.

Clause 13. The apparatus of any of clauses 11 and 12, wherein the processor is configured to determine scheduling of resources for the UEs to determine the one or more FDIQI estimates that the processor is to receive.

Clause 14. The apparatus of any of clauses 10-13, wherein the processor is configured to: determine a number of FDIQI estimates that each UE of one or more UEs is to transmit based on capability information of the one or more UEs to generate FDIQI estimates; and cause transmission of the determined number to the one or more UEs, wherein to receive one or more FDIQI estimates from the UEs, the processor is configured to receive the one or more FDIQI estimates from the one or more UEs based on the respective determined number of FDIQI estimates that each UE is to transmit.

Clause 15. The apparatus of any of clauses 10-14, wherein the one or more FDIQI estimates comprise a first FDIQI estimate for a first IQ modulator of a RU of the one or more RUs generated by a UE of the one or more UEs, and a second FDIQI estimate for a second IQ modulator of the same RU generated by the same UE.

Clause 16. The apparatus of any of clauses 10-15, wherein the one or more FDIQI estimates comprise a first FDIQI estimate for a first IQ modulator of a RU of the one or more RUs generated by a first UE of the one or more UEs in communication with the RU, and a second FDIQI estimate for a second IQ modulator of the RU generated by a second UE of the one or more UEs in communication with the RU.

Clause 17. An apparatus for wireless communication, comprising: a memory; and a processor coupled to the memory and configured to: receive, from a network node, information for coefficients for one or more frequency dependent in-phase-quadrature imbalance (FDIQI) compensation filters; and communicate with a user equipment (UE) utilizing a link that is compensated by the one or more FDIQI compensation filters.

Clause 18. The apparatus of clause 17, wherein the processor is configured to transmit temperature information to the network node that causes a refresh of the coefficients for the one or more FDIQI compensation filters.

Clause 19. The apparatus of any of clauses 17 and 18, further comprising: at least one antenna; and at least one IQ modulator coupled to the at least one antenna, wherein to communicate with the UE utilizing the link, the processor is configured to apply the one or more FDIQI compensation filters to a signal that is modulated by the at least one IQ modulator and transmitted by the at least one antenna.

Clause 20. A method of wireless communication, comprising: receiving one or more signals for determining frequency dependent in-phase quadrature imbalance (FDIQI) estimates; generating one or more FDIQI estimates based on the one or more signals; and transmitting the one or more FDIQI estimates to a network node.

Clause 21. The method of clause 20, further comprising receiving a subsequent signal generated based on the FDIQI estimates.

Clause 22. The method of any of clauses 20 and 21, wherein receiving the one or more signals comprises receiving a first signal from a first IQ modulator of a radio unit (RU) and receiving a second signal from a second IQ modulator of the RU, and wherein generating the one or more FDIQI estimates comprises generating a first FDIQI estimate for the first IQ modulator based on the first signal and generate a second FDIQI estimate for the second IQ modulator based on the second signal.

Clause 23. The method of any of clauses 20-22, wherein receiving the one or more signals comprises receiving a signal from a first IQ modulator of a radio unit (RU), and wherein generating the one or more FDIQI estimates comprises generating an FDIQI estimate for the first IQ modulator based on the signal and avoid generating an FDIQI estimate for a second IQ modulator of the RU.

Clause 24. The method of any of clauses 20-23, further comprising: receiving a request for the one or more FDIQI estimates, wherein generating the one or more FDIQI estimates comprises generating the one or more FDIQI estimates in response to the request for the one or more FDIQI estimates.

Clause 25. The method of clause 24, further comprising: receiving a capability inquiry for generating the one or more FDIQI estimates; determining capability for generating the one or more FDIQI estimates; and transmitting information indicative of the capability for generating the one or more FDIQI estimates, wherein receiving the request comprises receiving the request including information indicative of a number of FDIQI estimates to generate.

Clause 26. The method of clause 25, wherein the information indicative of the capability for generating the one or more FDIQI estimates comprises information indicative of a maximum number of FDIQI estimates the processor is configured to generate.

Clause 27. The method of any of clauses 20-26, further comprising receiving information indicative of a resource on which the processor is to transmit the one or more FDIQI estimates.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
    a memory; and
    a processor coupled to the memory and configured to:
        receive one or more signals for determining frequency dependent in-phase quadrature imbalance (FDIQI) estimates;
        generate one or more FDIQI estimates based on the one or more signals; and transmit the one or more FDIQI estimates to a network node.

2. The apparatus of claim 1, wherein the processor is configured to receive a subsequent signal generated based on the FDIQI estimates.

3. The apparatus of claim 1,
wherein the processor is in communication with a radio unit (RU),
wherein to receive the one or more signals, the processor is configured to receive a first signal from a first IQ modulator of the RU and receive a second signal from a second IQ modulator of the RU, and
wherein to generate the one or more FDIQI estimates, the processor is configured to generate a first FDIQI estimate for the first IQ modulator based on the first signal and generate a second FDIQI estimate for the second IQ modulator based on the second signal.

4. The apparatus of claim 1,
wherein the processor is in communication with a radio unit (RU),
wherein to receive the one or more signals, the processor is configured to receive a signal from a first IQ modulator of the RU, and
wherein to generate the one or more FDIQI estimates, the processor is configured to generate an FDIQI estimate for the first IQ modulator based on the signal and avoid generating an FDIQI estimate for a second IQ modulator of the RU.

5. The apparatus of claim 1, wherein the processor is configured to:
receive a request for the one or more FDIQI estimates, and
wherein to generate the one or more FDIQI estimates, the processor is configured to generate the one or more FDIQI estimates in response to the request for the one or more FDIQI estimates.

6. The apparatus of claim 5, wherein the processor is configured to:
receive a capability inquiry for generating the one or more FDIQI estimates;
determine capability for generating the one or more FDIQI estimates; and
transmit information indicative of the capability for generating the one or more FDIQI estimates, and
wherein to receive the request, the processor is configured to receive the request including information indicative of a number of FDIQI estimates to generate.

7. The apparatus of claim 6, wherein the information indicative of the capability for generating the one or more FDIQI estimates comprises information indicative of a maximum number of FDIQI estimates the processor is configured to generate.

8. The apparatus of claim 1, wherein the processor is configured to receive information indicative of a resource on which the processor is to transmit the one or more FDIQI estimates.

9. The apparatus of claim 1, wherein the one or more signals for generating FDIQI estimates comprise one or more training signals for generating FDIQI estimates.

10. An apparatus for wireless communication, comprising:
a memory; and
a processor coupled to the memory and configured to:
cause transmission of one or more signals for frequency dependent in-phase quadrature imbalance (FDIQI) estimation to one or more user equipments (UEs);
receive one or more FDIQI estimates from the one or more UEs for one or more radio units (RUs);
generate information for one or more FDIQI compensation filter coefficients based on the one or more FDIQI estimates; and
transmit the information for the one or more FDIQI compensation filter coefficients to the one or more RUs that are in communication with the one or more UEs.

11. The apparatus of claim 10, wherein the processor is configured to receive respective capability information of the one or more UEs to generate FDIQI estimates.

12. The apparatus of claim 11, wherein the processor is configured to cause transmission of respective capability inquiries to the one or more UEs inquiring capability of the one or more UEs to generate the FDIQI estimates, and wherein to receive the respective capability information, the processor is configured to receive the respective capability information in response to the transmission of the respective capability inquiries.

13. The apparatus of claim 11, wherein the processor is configured to determine scheduling of resources for the UEs to determine the one or more FDIQI estimates that the processor is to receive.

14. The apparatus of claim 10, wherein the processor is configured to:
determine a number of FDIQI estimates that each UE of one or more UEs is to transmit based on capability information of the one or more UEs to generate FDIQI estimates; and
cause transmission of the determined number to the one or more UEs, and
wherein to receive one or more FDIQI estimates from the UEs, the processor is configured to receive the one or more FDIQI estimates from the one or more UEs based on the respective determined number of FDIQI estimates that each UE is to transmit.

15. The apparatus of claim 10, wherein the one or more FDIQI estimates comprise a first FDIQI estimate for a first IQ modulator of a RU of the one or more RUs generated by a UE of the one or more UEs, and a second FDIQI estimate for a second IQ modulator of the same RU generated by the same UE.

16. The apparatus of claim 10, wherein the one or more FDIQI estimates comprise a first FDIQI estimate for a first IQ modulator of a RU of the one or more RUs generated by a first UE of the one or more UEs in communication with the RU, and a second FDIQI estimate for a second IQ modulator of the RU generated by a second UE of the one or more UEs in communication with the RU.

17. An apparatus for wireless communication, comprising:
a memory; and
a processor coupled to the memory and configured to:
receive, from a network node, information for coefficients for one or more frequency dependent in-phase-quadrature imbalance (FDIQI) compensation filters; and
communicate with a user equipment (UE) utilizing a link that is compensated by the one or more FDIQI compensation filters.

18. The apparatus of claim 17, wherein the processor is configured to transmit temperature information to the network node that causes a refresh of the coefficients for the one or more FDIQI compensation filters.

19. The apparatus of claim 17, further comprising:

at least one antenna; and at least one IQ modulator coupled to the at least one antenna, wherein to communicate with the UE utilizing the link, the processor is configured to apply the one or more FDIQI compensation filters to a signal that is modulated by the at least one IQ modulator and transmitted by the at least one antenna.

20. A method of wireless communication, comprising:

receiving one or more signals for determining frequency dependent in-phase quadrature imbalance (FDIQI) estimates;

generating one or more FDIQI estimates based on the one or more signals; and transmitting the one or more FDIQI estimates to a network node.

21. The method of claim 20, further comprising receiving a subsequent signal generated based on the FDIQI estimates.

22. The method of claim 20, wherein receiving the one or more signals comprises receiving a first signal from a first IQ modulator of a radio unit (RU) and receiving a second signal from a second IQ modulator of the RU, and wherein generating the one or more FDIQI estimates comprises generating a first FDIQI estimate for the first IQ modulator based on the first signal and generate a second FDIQI estimate for the second IQ modulator based on the second signal.

23. The method of claim 20, wherein receiving the one or more signals comprises receiving a signal from a first IQ modulator of a radio unit (RU), and wherein generating the one or more FDIQI estimates comprises generating an FDIQI estimate for the first IQ modulator based on the signal and avoid generating an FDIQI estimate for a second IQ modulator of the RU.

24. The method of claim 20, further comprising:

receiving a request for the one or more FDIQI estimates, wherein generating the one or more FDIQI estimates comprises generating the one or more FDIQI estimates in response to the request for the one or more FDIQI estimates.

25. The method of claim 24, further comprising:

receiving a capability inquiry for generating the one or more FDIQI estimates;

determining capability for generating the one or more FDIQI estimates; and transmitting information indicative of the capability for generating the one or more FDIQI estimates, wherein receiving the request comprises receiving the request including information indicative of a number of FDIQI estimates to generate.

26. The method of claim 25, wherein the information indicative of the capability for generating the one or more FDIQI estimates comprises information indicative of a maximum number of FDIQI estimates a user equipment is configured to generate.

27. The method of claim 20, further comprising receiving information indicative of a resource on which a user equipment is to transmit the one or more FDIQI estimates.

* * * * *